(12) United States Patent
Xu et al.

(10) Patent No.: US 11,677,689 B2
(45) Date of Patent: Jun. 13, 2023

(54) DATA PROCESSING METHOD AND APPARATUS

(71) Applicant: HUAWEI TECHNOLOGIES CO., LTD., Guangdong (CN)

(72) Inventors: Xiaoying Xu, Shanghai (CN); Guohua Zhou, Shanghai (CN); Xing Liu, Shenzhen (CN); Qinghai Zeng, Shanghai (CN); Li Ji, London (GB)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/036,990

(22) Filed: Sep. 29, 2020

(65) Prior Publication Data

US 2021/0014178 A1  Jan. 14, 2021

Related U.S. Application Data

(63) Continuation of application No. PCT/CN2019/081544, filed on Apr. 4, 2019.

(30) Foreign Application Priority Data

Apr. 4, 2018 (CN) .......................... 201810301182.4

(51) Int. Cl.
*H04L 12/861* (2013.01)
*H04L 49/9005* (2022.01)
(Continued)

(52) U.S. Cl.
CPC ...... *H04L 49/9005* (2013.01); *H04L 47/2416* (2013.01); *H04L 47/283* (2013.01); *H04L 47/32* (2013.01)

(58) Field of Classification Search
CPC ... H04L 65/607; H04L 47/2416; H04L 47/26; H04L 47/283; H04L 47/30; H04L 47/32;
(Continued)

(56) References Cited

U.S. PATENT DOCUMENTS

| 7,263,095 B1 * | 8/2007 | Sarkar | H04L 47/824 |
| | | | 370/352 |
| 7,680,099 B2 * | 3/2010 | Lakaniemi | H04L 47/10 |
| | | | 370/352 |

(Continued)

FOREIGN PATENT DOCUMENTS

| CN | 101232740 A | 7/2008 |
| CN | 101969403 A | 2/2011 |

(Continued)

OTHER PUBLICATIONS

Oyman et al. U.S. Appl. No. 62/643,541, filed Mar. 15, 2018 (Year: 2 018).*

(Continued)

*Primary Examiner* — Wutchung Chu
(74) *Attorney, Agent, or Firm* — Fish & Richardson P.C.

(57) ABSTRACT

Example data processing methods and apparatuses are disclosed. In one example data processing method, a first terminal obtains packet delay budget adjustment information, where the packet delay budget adjustment information is used to indicate an adjusted packet delay budget, a packet delay budget adjustment amount, or a packet delay budget adjustment range. The first terminal adjusts a size of a jitter buffer based on the packet delay budget adjustment information, and then buffers data based on the adjusted jitter buffer.

18 Claims, 16 Drawing Sheets

(51) Int. Cl.
*H04L 47/2416* (2022.01)
*H04L 47/283* (2022.01)
*H04L 47/32* (2022.01)

(58) Field of Classification Search
CPC . H04L 49/9005; H04L 65/80; H04L 28/0236; H04L 28/0289; H04L 43/0852; H04L 47/10; H04L 27/2662; H04L 47/087; H04L 43/0858; H04L 47/22; H04L 3/0632; H04L 5/14; H04L 65/604; H04L 1/1838; H04L 43/087; H04L 1/0002; H04L 41/5025; H04L 43/0817; H04L 65/1069; H04L 65/1016; H04L 47/822; H04L 12/4633; H04L 12/5601; H04L 41/0893; H04L 47/805; H04L 12/66; H04L 47/2441; H04L 47/28; H04L 47/56; H04W 28/0236; H04W 28/12; H04W 72/0446; H04W 28/10; H04W 52/0212; H04W 28/18; H04W 28/02; H04W 80/12; H04W 24/08; H04W 28/20; H04W 28/0268; H04W 28/24; H04W 24/10; H04W 72/12; H04W 4/40; H04W 72/1284; H04W 28/0289; H04J 3/0682; H04J 3/0632; H04J 3/0664; H04J 3/0667; H04J 2203/0089; H04J 3/065; H04N 21/23406
See application file for complete search history.

(56) References Cited

U.S. PATENT DOCUMENTS

| | | | | |
|---|---|---|---|---|
| 10,735,120 | B1* | 8/2020 | Kantharaju | H04L 43/087 |
| 2007/0019552 | A1* | 1/2007 | Senarath | H04W 28/02 370/235 |
| 2008/0151765 | A1* | 6/2008 | Cheruvathery | H04J 3/0632 370/252 |
| 2008/0165766 | A1 | 7/2008 | Synnergren | |
| 2010/0265834 | A1* | 10/2010 | Michaelis | H04L 65/1069 370/252 |
| 2010/0296525 | A1* | 11/2010 | Mahkonen | H04L 47/2416 370/516 |
| 2011/0205915 | A1* | 8/2011 | Skrabutenas | H04M 9/082 370/252 |
| 2012/0323568 | A1* | 12/2012 | Bruhn | H04L 65/762 704/201 |
| 2014/0226476 | A1* | 8/2014 | Bertze | H04W 36/0033 370/230.1 |
| 2015/0332704 | A1* | 11/2015 | Sun | G10L 21/0208 704/227 |
| 2015/0350099 | A1* | 12/2015 | Sun | H04L 43/087 370/412 |
| 2016/0285720 | A1* | 9/2016 | Maenpaa | H04L 43/0852 |
| 2016/0302128 | A1* | 10/2016 | Anchan | H04W 36/30 |
| 2017/0034026 | A1* | 2/2017 | Li | H04L 65/00 |
| 2017/0118683 | A1* | 4/2017 | Son | H04W 36/023 |
| 2017/0245184 | A1 | 8/2017 | Nagesh Shetigar et al. | |
| 2017/0324652 | A1* | 11/2017 | Lee | H04L 43/028 |
| 2017/0359186 | A1* | 12/2017 | Atari | H04L 41/5067 |
| 2018/0279319 | A1* | 9/2018 | Yu | H04W 72/542 |
| 2018/0295050 | A1* | 10/2018 | Lee | H04L 43/087 |
| 2019/0014050 | A1* | 1/2019 | Wang | H04L 49/9005 |
| 2019/0045578 | A1* | 2/2019 | Oyman | H04L 43/0852 |
| 2019/0104079 | A1* | 4/2019 | Wang | H04L 43/16 |
| 2019/0215729 | A1* | 7/2019 | Oyman | H04L 65/1016 |
| 2019/0288953 | A1* | 9/2019 | Yavuz | H04W 28/0257 |
| 2020/0127577 | A1* | 4/2020 | Sun | H04L 1/205 |
| 2020/0280871 | A1* | 9/2020 | Khirallah | H04W 28/0257 |
| 2021/0067279 | A1* | 3/2021 | Sarkis | H04W 72/51 |
| 2022/0046462 | A1* | 2/2022 | De Andrade Jardim | H04L 47/283 |

FOREIGN PATENT DOCUMENTS

| | | |
|---|---|---|
| CN | 102223210 A | 10/2011 |
| CN | 102739503 A | 10/2012 |
| CN | 103596285 A | 2/2014 |
| CN | 104168218 A | 11/2014 |
| RU | 2445737 C2 | 3/2012 |
| WO | 2013051975 A1 | 4/2013 |

OTHER PUBLICATIONS

Lin et al. CN104168218A translation filed Aug. 15, 2014 (Year: 2014).*
3GPP TS 26.114 V15.2.0 (Mar. 2018), "3rd Generation Partnership Project; Technical Specification Group Services and System Aspects; IP Multimedia Subsystem (IMS);Multimedia Telephony; Media handling and interaction(Release 15)," Mar. 2018, 399 pages.
3GPP TR 26.910 V0.1.0 (Feb. 2018), "3rd Generation Partnership Project;Technical Specification Group Services and System Aspects; Study on Media Handling Aspects of RAN Delay Budget Reporting in MTSI (Release 15)," Feb. 2018, 11 pages.
Office Action issued in Chinese Application No. 201810301182.4 dated Jun. 2, 2020, 7 pages.
PCT International Search Report and Written Opinion issued in International Application No. PCT/CN2019/081544 dated Jul. 8, 2019, 13 pages (with English translation).
Extended European Search Report issued in European Application No. 19782138.2 dated Mar. 17, 2021, 9 pages.
Yuhe et al., "New Solutions of VoIP on Multi-hop Wireless Network," 2009 IITA International Conference on Control, Automation and Systems Engineering (case 2009), Aug. 7, 2009, 4 pages.
3GPP TS 26.114 V1.0.0 (Nov. 2006), "3rd Generation Partnership Project; Technical Specification Group Services and System Aspects IP Multimedia Subsystem (IMS); Multimedia Telephony; Media handling and interaction (Release 7)," Nov. 2006, 56 pages.
DSLHome—Technical Working Group, "DSLHome™ Provisioning Parameters for VoIP CPE," Technical Report, DSL Forum TR-104, Sep. 2005, 54 pages.
Office Action issued in Chinese Application No. 201810301182.4 dated Feb. 20, 2021, 7 pages.
Office Action issued in Russian Application No. 2020135589/07(065566) dated May 17, 2022, 21 pages (with English translation).

* cited by examiner

DATA PROCESSING METHOD AND APPARATUS

CROSS-REFERENCE TO RELATED APPLICATIONS

This application is a continuation of International Application No. PCT/CN2019/081544, filed on Apr. 4, 2019, which claims priority to Chinese Patent Application No. 201810301182.4, filed on Apr. 4, 2018. The disclosures of the aforementioned applications are hereby incorporated by reference in their entireties.

TECHNICAL FIELD

This application relates to the field of communications technologies, and in particular, to a data processing method and apparatus.

BACKGROUND

In voice over long term evolution system (VoLTE) communication, no dedicated logical link is used for transmission of a voice signal. Therefore, voice quality cannot be ensured. The voice quality is affected by an end-to-end delay, a delay jitter, a packet loss rate, and the like. The delay jitter is one of important parameters that affect the voice quality. Therefore, a specific measure needs to be taken to eliminate the impact of the delay jitter, to ensure the voice quality.

In the prior art, a buffer (jitter buffer) is set at a receive end of a voice data packet to decrease the delay jitter. A main idea of the jitter buffer is to buffer received voice packets for a period of time and then play the voice packets evenly to a user. If the period of time is shorter than the delay jitter, the delay jitter cannot be eliminated completely. If the period of time is greater than the delay jitter, the delay jitter can be eliminated. However, a disadvantage is that an end-to-end communication delay is increased. Therefore, a most ideal state is that all voice data packets have a same sum of a transmission delay and a buffer delay of in the jitter buffer. However, in an actual application, because the transmission delay of the voice data packet in the network changes, it is difficult to reach the most ideal state. Based on this, a method for dynamically adjusting a jitter buffer is provided in the prior art, to dynamically adjust a size of the jitter buffer based on changes of the delay jitter.

In the existing method for dynamically adjusting a jitter buffer, the receive end needs to adjust a size or a depth of the jitter buffer based on statistics about a packet loss rate and a delay jitter that are collected in a period of time. Because collecting the packet loss rate and the delay jitter needs to consume a specific time, the receive end cannot adjust the size of the jitter buffer in time. As a result, voice quality declines significantly within a period of time before the receive end decides to adjust the jitter buffer, or even packet loss occurs, causing an increase in the packet loss rate.

SUMMARY

Embodiments of this application provide a data processing method and apparatus, to relatively quickly adjust a size of a jitter buffer, and improve voice communication quality.

According to a first aspect, this application provides a data processing method. The method may be applied to a first terminal, or may be applied to a chip inside the first terminal. In the method, the first terminal obtains packet delay budget adjustment information, where the packet delay budget adjustment information is used to indicate an adjusted packet delay budget, a packet delay budget adjustment amount, or a packet delay budget adjustment range; adjusts a size of a jitter buffer based on the packet delay budget adjustment information; and then buffers data based on the adjusted jitter buffer.

According to a second aspect, this application provides a data processing method. The method may be applied to a first network device, or may be applied to a chip inside the first network device. In this method, the first network device determines packet delay budget adjustment information or a configuration parameter, where the packet delay budget adjustment information is used to indicate an adjusted packet delay budget, a packet delay budget adjustment amount, or a packet delay budget adjustment range. After the first network device determines the packet delay budget adjustment information or the configuration parameter, the first network device sends the packet delay budget adjustment information or the configuration parameter to a first terminal.

According to a third aspect, this application provides a data processing method. The method may be applied to a second terminal, or may be applied to a chip inside the second terminal. In this method, the second terminal determines packet delay budget adjustment information or a configuration parameter, where the packet delay budget adjustment information is used to indicate an adjusted packet delay budget, a packet delay budget adjustment amount, or a packet delay budget adjustment range. After the second terminal determines the packet delay budget adjustment information or the configuration parameter, the second terminal sends the packet delay budget adjustment information or the configuration parameter to a first terminal.

According to a fourth aspect, this application provides a data processing apparatus, including units or means configured to perform the steps in the first aspect, the second aspect, or the third aspect.

According to a fifth aspect, this application provides a data processing apparatus, including at least one processor and a memory, where the at least one processor is configured to perform the method provided in the first aspect, the second aspect, or the third aspect.

According to a sixth aspect, this application provides a data processing apparatus, including at least one processor and an interface circuit, where the at least one processor is configured to perform the method provided in the first aspect, the second aspect, or the third aspect.

According to a seventh aspect, this application provides a data processing program. When being executed by a processor, the program is configured to perform the method in the first aspect, the second aspect, or the third aspect.

According to an eighth aspect, a program product is provided, for example, a computer-readable storage medium, including the program according to the seventh aspect.

It can be learned that, in the foregoing aspects, because the packet delay budget adjustment information can represent a network quality status, the first terminal can perceive the network quality status in time based on the obtained packet delay budget adjustment information, rather than perceive the network quality status based on information such as statistics about a packet loss rate and a delay jitter that are collected in a period of time, as the first terminal does in the prior art. That is, in this application, the first terminal can perceive the network quality status in time, and can quickly adjust the size of the jitter buffer based on the packet delay budget adjustment information.

In the foregoing aspects, the configuration parameter is related to an air interface transmission delay, and may include at least one of a discontinuous reception (DRX) cycle, preset duration of a packet data convergence protocol (PDCP) discard timer, and a coverage enhancement parameter.

How the first terminal obtains the packet delay budget adjustment information is not limited in this application. In a possible design, the first terminal receives the packet delay budget adjustment information sent by the first network device or the second terminal, and then adjusts the size of the jitter buffer based on the received packet delay budget adjustment information. In this way, the first terminal can perceive the network status in time based on the packet delay budget adjustment information sent by the second terminal or the first network device, and does not need to determine the network status based on statistics about parameters collected in a period of time, as the first terminal does in the prior art, to quickly adjust the size of the jitter buffer. In another possible design, the first terminal receives the configuration parameter sent by the first network device or the second terminal, determines the packet delay budget adjustment information based on the received configuration parameter, and further adjusts the size of the jitter buffer based on the determined packet delay budget adjustment information. In this way, the first terminal can quickly determine the packet delay budget adjustment information based on the received configuration parameter, and quickly adjust the size of the jitter buffer.

In still another possible design, before obtaining the packet delay budget adjustment information, the first terminal sends at least one of first packet delay budget information, a first end-to-end delay, and a first packet loss rate to the first network device. In this design, the first network device determines the packet delay budget adjustment information or the configuration parameter based on at least one of the first packet delay budget information, the first end-to-end delay, and the first packet loss rate. In this way, when the first network device determines the packet delay budget adjustment information or the configuration parameter, the first network device not only considers a locally known parameter that affects network quality, but also considers parameters that may affect the network quality and whose statistics are collected by the first terminal side, so that the determined packet delay budget adjustment information or configuration parameter is more accurate.

The first packet delay budget information includes a packet delay budget adjustment amount, a packet delay budget adjustment range, or a packet delay budget expected by the first terminal.

In still another possible design, the first packet delay budget information is carried in a first delay budget adjustment report.

In still another possible design, before determining the packet delay budget adjustment information or the configuration parameter, the first network device receives at least one of second packet delay budget information, a second end-to-end delay, and a second packet loss rate that are sent by a second network device or the second terminal. In this design, the first network device can determine the packet delay budget adjustment information or the configuration parameter based on at least one of the first packet delay budget information, the first end-to-end delay, and the first packet loss rate, and at least one of the second packet delay budget information, the second end-to-end delay, and the second packet loss rate. According to the method, when determining the packet delay budget adjustment information or the configuration parameter, the first network device not only considers a network status at the local side, but also considers a network status at the second terminal side that communicates with the first terminal, so that the determined packet delay budget adjustment information or configuration parameter is more accurate.

The second packet delay budget information includes the packet delay budget adjustment amount, the packet delay budget adjustment range, or the packet delay budget that is expected by the second terminal or that is of the second terminal and is determined by the second network device.

In still another possible design, the second packet delay budget information is carried in a second delay budget adjustment report.

In still another possible design, before determining the packet delay budget adjustment information or the configuration parameter, the second terminal receives first packet delay budget adjustment information or a first configuration parameter sent by the second network device, where the first packet delay budget adjustment information is used to indicate an adjusted first packet delay budget, a first packet delay budget adjustment amount, or a first packet delay budget adjustment range, and the first configuration parameter is related to the air interface transmission delay. In this design, the determining, by a second terminal, packet delay budget adjustment information or a configuration parameter includes: determining, by the second terminal, the first packet delay budget adjustment information or the first configuration parameter sent by the second network device as the packet delay budget adjustment information or the configuration parameter.

In still another possible design, the first packet delay budget adjustment information or the first configuration parameter is determined by the second network device based on at least one of the second packet delay budget information, the second end-to-end delay, and the second packet loss rate that are sent by the second terminal. In this design, before receiving the first packet delay budget adjustment information or the first configuration parameter sent by the second network device, the second terminal sends at least one of the second packet delay budget information, the second end-to-end delay, and the second packet loss rate to the second network device.

The second packet delay budget information includes a packet delay budget adjustment amount, a packet delay budget adjustment range, or a packet delay budget expected by the second terminal.

In this application, the second terminal may send the packet delay budget adjustment information or the configuration parameter to the first terminal in the following three manners:

Manner 1: The second terminal sends the packet delay budget adjustment information or the configuration parameter to the first terminal via an application layer message.

Manner 2: The second terminal sends the packet delay budget adjustment information or the configuration parameter to the first terminal via the second network device.

Manner 3: The second terminal sends the packet delay budget adjustment information or the configuration parameter to the first terminal via the second network device and the first network device.

DESCRIPTION OF EMBODIMENTS

Figure 1:
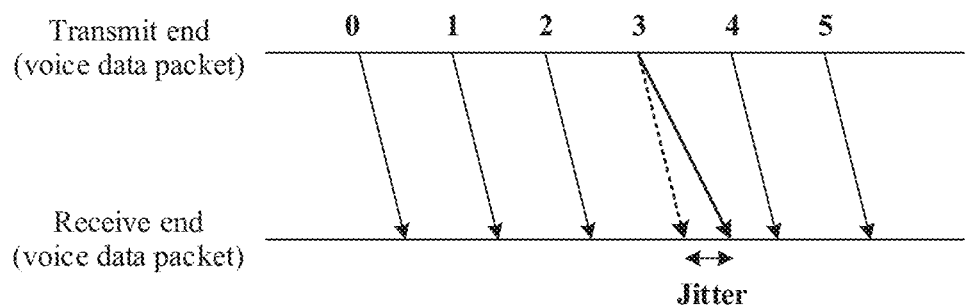
FIG. 1 is a schematic diagram of a delay jitter according to this application.

The following describes the technical solutions in the embodiments of this application.

First, some terms in this application are described, to help a person skilled in the art have a better understanding.

(1) A terminal, also referred to as user equipment (UE), a mobile station (MS), a mobile terminal (MT), or the like, is a device that provides voice and/or data connectivity for a user and has a network access function, for example, a hand-held device or a vehicle-mounted device with a wireless connection function. Currently, some examples of the terminal are: a mobile phone, a tablet computer, a notebook computer, a palmtop computer, a mobile internet device (MID), a wearable device, a virtual reality (VR) device, an augmented reality (AR) device, a wireless terminal in industrial control, a wireless terminal in self driving, a wireless terminal in remote medical surgery, a wireless terminal in a smart grid, a wireless terminal in transportation safety, a wireless terminal in a smart city, a wireless terminal in a smart home, and the like.

(2) A network device is a device in a wireless network, for example, a radio access network (RAN) node that connects a terminal to the wireless network, and the RAN node may also be referred to as a base station. Currently, some examples of the RAN node are: a continuously evolved NodeB (gNB), a transmission reception point (TRP), an evolved NodeB (eNB), a radio network controller (RNC), a NodeB (NB), a base station controller (BSC), a base transceiver station (BTS), a home base station (for example, home evolved NodeB, or home NodeB, HNB), a base band unit (BBU), a wireless fidelity (WiFi) access point (AP), or the like. In a network structure, the network device may include a centralized unit (CU) node, a distributed unit (DU) node, or a RAN device including a CU node and a DU node.

(3) "A plurality of" means two or more, and another quantifier is similar to this. The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects.

(4) "Network" and "system" are usually alternately used, but a person skilled in the art may understand meanings of the "network" and the "system".

(5) An internet protocol (IP) multimedia system (IMS) network refers to a general-purpose network that provides a multimedia service based on an IP-based network.

(6) VoLTE is a voice call over an LTE system and a voice service over an IMS network.

(7) A packet switching technology, also referred to as a data packet switching technology, is a technology in which data sent by a transmit end is divided in to parts with a specific length, each part is referred to as a packet or a data packet, and information is transmitted in a packet transmission manner. Each packet has a packet header in the front of the packet, to indicate an address to which the packet is sent. Then, an intermediate node forwards each packet to a receive end based on an address identifier of the each packet. This technology cannot ensure completely reliable delivery of data packets. Consequently, end-to-end communication quality cannot be ensured.

(8) Delay jitter refers to a change of a delay during network transmission. A delay jitter in voice transmission is used as an example. Referring to FIG. 1, when a receiving time interval of two voice data packets is inconsistent with a sending time interval of the two voice data packets, a jitter occurs, and the jitter is referred to as the delay jitter.

Figure 2:
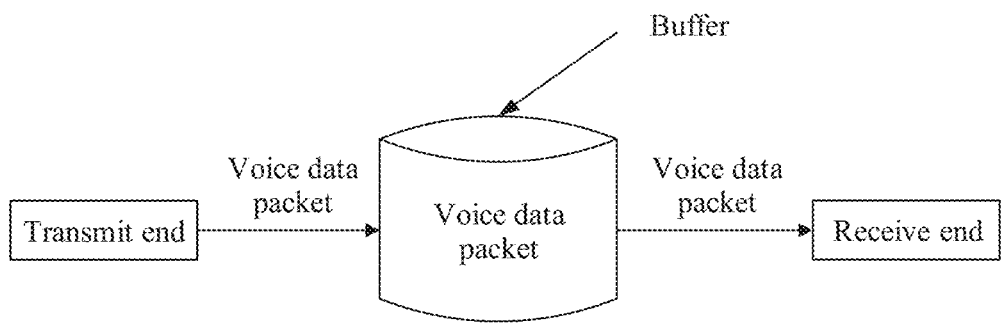
FIG. 2 is a schematic diagram of a buffer mechanism of a jitter buffer according to this application.

(9) A buffer mechanism of a jitter buffer is buffering received voice data packets in the jitter buffer for a period of time, and then playing the voice data packets evenly to the receive end at a time interval the same as that used when the transmit end sends the voice data packets. Specifically, as shown in FIG. 2, after a specific quantity of voice data packets are buffered in the jitter buffer, the voice data packets are played at a constant speed at the receive end. In addition, the jitter buffer also has a grooming and compensation mechanism. When the transmit end sends the voice data packets at a high speed, a quantity of voice data packets buffered in the jitter buffer exceeds a limited range. In this case, the grooming mechanism, for example, discarding a voice mute packet, may be started, to maintain a capability of continuously buffering the voice data packets. When the transmit end sends the voice data packets at a low speed, voice data packets buffered in the jitter buffer cannot meet an output requirement. In this case a compensation mechanism, for example, increasing comfort noise or performing packet loss compensation, may be started.

(10) Packet loss compensation: When packet loss occurs in a network, information about lost frames is recovered by using data of several previous frames based on a time domain correlation of voice signals, thereby achieving smooth compensation.

(11) A non-redundant coding mode refers to a coding mode in which a currently sent speech frame does not carry redundant information.

(12) A full-frame redundancy coding mode refers to a coding mode in which a currently sent speech frame carries a previously sent speech frame.

Figure 3:
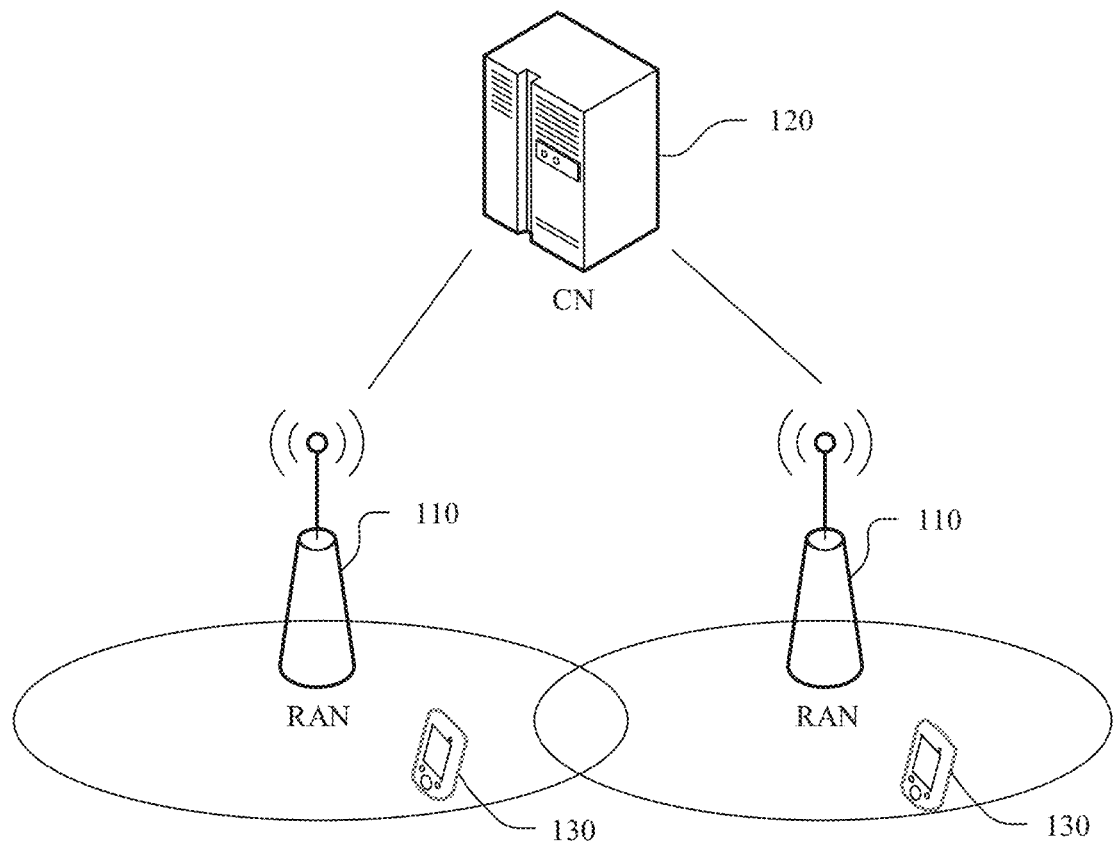
FIG. 3 is a schematic diagram of a communications system according to an embodiment of this application.

FIG. 3 is a schematic diagram of a communications system according to an embodiment of this application. As shown in FIG. 3, a terminal 130 accesses a wireless network, to obtain a service of an external network (for example, Internet) over the wireless network, or communicate with another terminal over the wireless network. The wireless network includes a RAN 110 and a core network (CN) 120. The RAN 110 is configured to connect the terminal 130 to the wireless network, and the CN 120 is configured to manage the terminal and provide a gateway for communicating with the external network.

Figure 4:
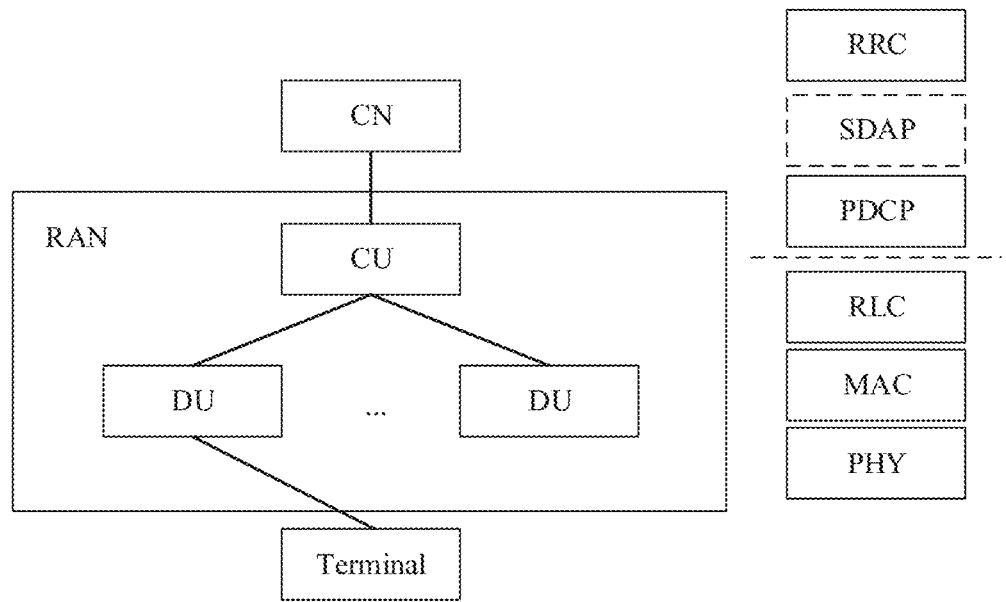
FIG. 4 is a schematic diagram of a network architecture according to an embodiment of this application.

FIG. 4 is a schematic diagram of a network architecture according to an embodiment of this application. As shown in FIG. 4, the network architecture includes a CN device and a RAN device. The RAN device includes a baseband apparatus and a radio frequency apparatus. The baseband apparatus may be implemented by one node, or may be implemented by a plurality of nodes. The radio frequency apparatus may be independently implemented remote from the baseband apparatus, or may be integrated into the baseband apparatus, or a part of the radio frequency apparatus is deployed remotely and the other part of the radio frequency apparatus is integrated into the baseband apparatus. For example, in an LTE communications system, the RAN device (eNB) includes a baseband apparatus and a radio frequency apparatus. The radio frequency apparatus may be disposed remote from the baseband apparatus. For example, a remote radio unit (RRU) is disposed remote from a BBU.

Communication between the RAN device and a terminal complies with a specific protocol layer structure. For example, a control plane protocol layer structure may include functions of protocol layers such as a radio resource control (RRC) layer, a packet data convergence protocol (PDCP) layer, a radio link control (RLC) layer, a media access control (MAC) layer, and a physical layer. A user plane protocol layer structure may include functions of protocol layers such as a PDCP layer, an RLC layer, a MAC layer, and a physical layer. In an implementation, there may be a service data adaptation protocol (SDAP) layer above the PDCP layer.

The RAN device may implement the functions of the protocol layers such as the RRC layer, the PDCP layer, the RLC layer, and the MAC layer by using one node; or may implement the functions of these protocol layers by using a plurality of nodes. For example, in an evolved structure, the RAN device may include a centralized unit (CU) and a distributed unit (DU), and a plurality of DUs may be centrally controlled by one CU. As shown in FIG. 4, functions may be divided to the CU and the DU based on protocol layers of a wireless network. For example, functions of a PDCP layer and a protocol layer above the PDCP layer are set on the CU, and functions of a protocol layer below the PDCP layer, such as an RLC layer and a MAC layer, are set on the DU.

Division of the protocol layers is merely an example, and division may alternatively be performed at another protocol layer, for example, at an RLC layer. Functions of the RLC layer and layers above the RLC layer are set on the CU, and functions of protocol layers below the RLC layer are set on the DU. Alternatively, division is performed in a protocol layer. For example, some functions of the RLC layer and functions of protocol layers above the RLC layer are set on the CU, and remaining functions of the RLC layer and functions of protocol layers below the RLC layer are set on the DU. In addition, division may alternatively be performed in another manner, for example, performed based on a latency. A function whose processing time needs to meet a latency requirement is set on the DU, and a function whose processing time does not need to meet the latency requirement is set on the CU.

In addition, the radio frequency apparatus may not be arranged in the DU and is remote from the DU, or may be integrated into the DU, or a part of the radio frequency apparatus is arranged remote from the DU and the other part is integrated into the DU. This is not limited herein.

Figure 5:
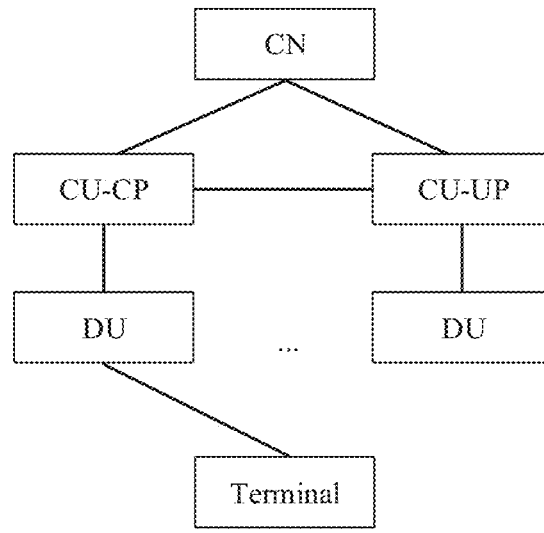
FIG. 5 is a schematic diagram of another network architecture according to an embodiment of this application.

Still referring to FIG. 5, compared with the architecture shown in FIG. 4, a control plane (CP) and a user plane (UP) of the CU may be separated and implemented by using different entities: a control plane CU entity (CU-CP entity) and a user plane CU entity (CU-UP entity).

In the foregoing network architecture, signaling generated by the CU may be sent to the terminal via the DU, or signaling generated by the terminal may be sent to the CU via the DU. The DU may not parse the signaling, but directly encapsulates the signaling at a protocol layer and transparently transmits the signaling to the terminal or the CU. In the following embodiments, if transmission of such signaling between the DU and the terminal device is involved, signaling sent or received by the DU includes such signaling in this scenario. For example, RRC or PDCP layer signaling is finally processed as PHY layer signaling and sent to the terminal, or is converted from received PHY layer signaling. In this architecture, the RRC or PDCP layer signaling may also be considered as being sent by the DU, or sent by the DU and the radio frequency apparatus.

In the foregoing embodiment, the CU is classified as a network device at the RAN side. In addition, the CU may be alternatively classified as a network device at the CN side. This is not limited herein.

An apparatus in the following embodiments of this application may be located in the terminal or the network device based on a function implemented by the apparatus. When the foregoing CU-DU structure is used, the network device may be a CU node, a DU node, or a RAN device including the CU node and the DU node.

In voice communication based on a VoLTE mechanism, when network quality is relatively poor, voice communication quality is affected. For example, an end-to-end delay, a delay jitter, and a packet loss rate may be increased, and the voice communication quality declines. To improve the voice communication quality, some measures will be taken to decrease or even eliminate the end-to-end delay, the delay jitter, and the packet loss rate in related technologies.

Figure 6:
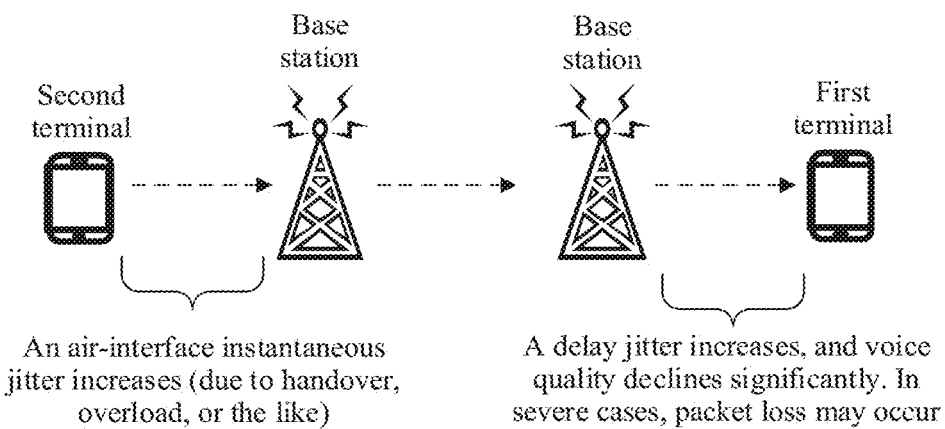
FIG. 6 is a schematic diagram of a voice communication scenario according to this application.

Two terminals that perform a VoLTE call are used as an example to describe a delay jitter generation process and a delay jitter reduction measure. Referring to FIG. 6, for ease of description, a terminal that receives voice data is referred to as a first terminal, a terminal that sends the voice data is referred to as a second terminal, and the first terminal and the second terminal perform voice communication via a base station. When network quality between the first terminal and the second terminal declines, for example, when an air-interface instantaneous jitter is increased due to switching or overload, a delay jitter at the first terminal side may increase, and further, voice quality is significantly declined. In severe cases, the first terminal may fail to receive some voice data packets sent by the second terminal, that is, packet loss occurs.

In a related technology, a jitter buffer is set in the first terminal to decrease or even eliminate the delay jitter. The first terminal first buffers received voice data packets to the jitter buffer, then buffers the voice data packets for a period of time to cancel the delay jitter, and then evenly plays the buffered voice data packets. If an existing method for dynamically adjusting a jitter buffer (which may also be referred to as an adaptive jitter buffer) is used, the first terminal needs to adjust a size of the jitter buffer (which may also be referred to as a depth of the jitter buffer) based on information such as statistics about a packet loss rate and a delay jitter that are collected within a period of time, to improve voice quality. As shown in FIG. 6, after the air-interface instantaneous jitter is increased, the first terminal needs to perceive a change of the network quality based on the information such as the statistics about the packet loss rate and the delay jitter that are collected in the period of time, and further increases the size of the jitter buffer based on the information such as the collected packet loss rate and delay jitter. Because collecting statistics about the packet loss rate and the delay jitter needs to consume some time, the first terminal cannot adjust the size of the jitter buffer in time, the voice quality is significantly declined, and even a packet loss occurs in a period of time before the first terminal decides to adjust the jitter buffer. On the contrary, when the air-interface instantaneous jitter is decreased (not shown in FIG. 6), the first terminal cannot decrease a buffer time of the jitter buffer at the local end in time, and consequently, cannot ensure consistency of the voice data packets received by the first terminal and the voice data packets sent by the second terminal, resulting in poor user experience.

Based on the foregoing existing problem, an embodiment of this application provide a data processing method. When the network quality declines, the first terminal directly obtains a factor used to adjust the jitter buffer to adjust the size of the jitter buffer in time by adjusting the factor of the jitter buffer, rather than adjust the size of the jitter buffer based on statistics about results collected within a period of time.

Figure 7A:
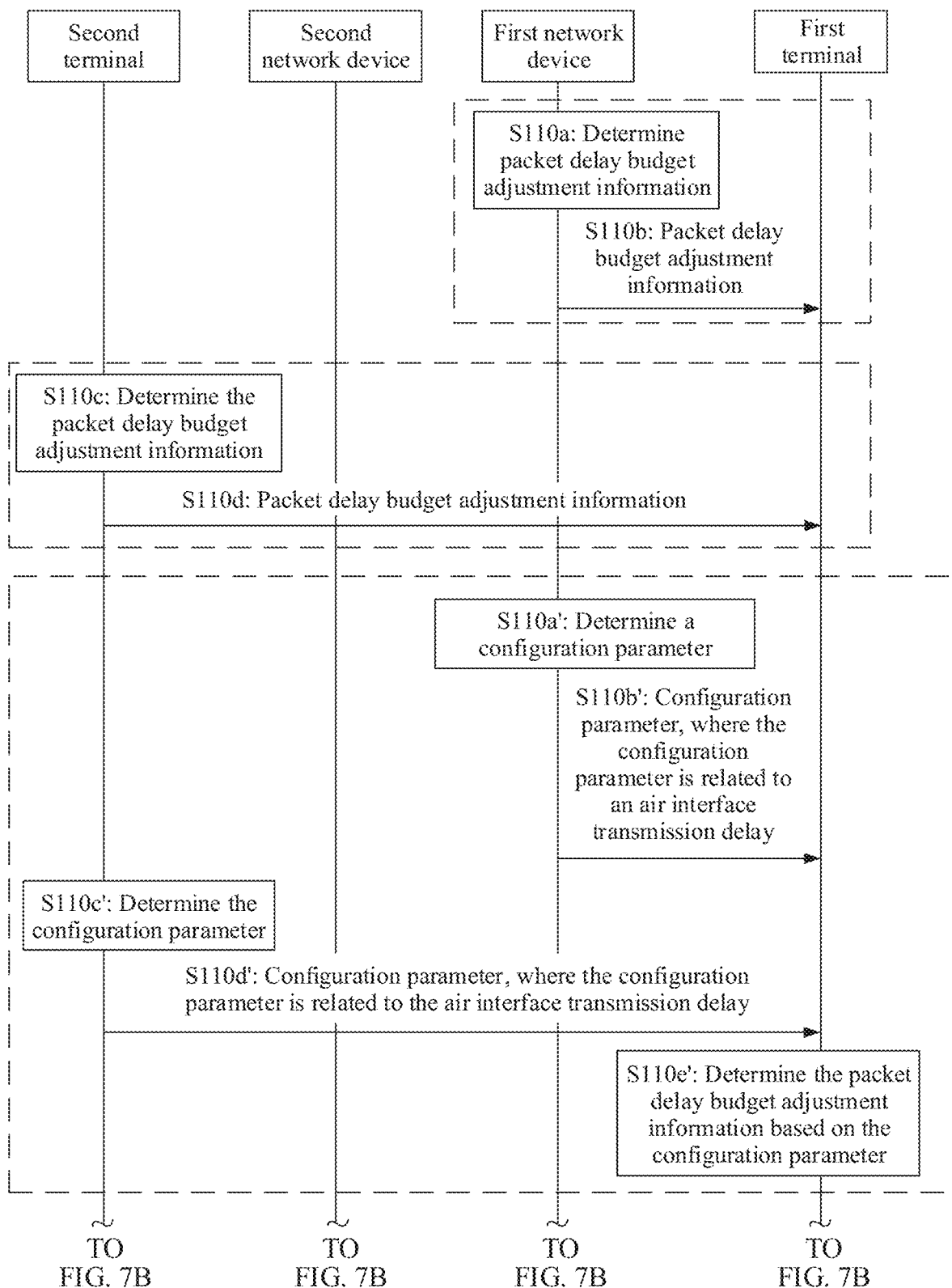
FIG. 7A and FIG. 7B are an implementation flowchart of a data processing method according to an embodiment of this application.
Figure 7B:
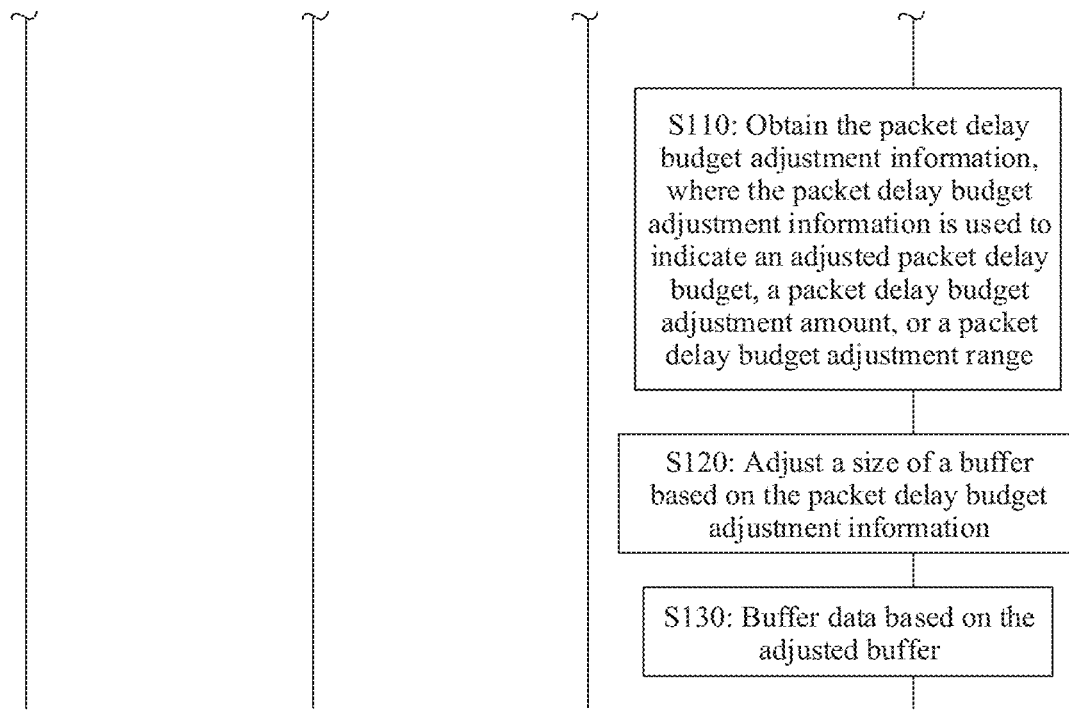

FIG. 7 is an implementation flowchart of a data processing method according to an embodiment of this application. As shown in FIG. 7, the method includes the following steps.

S110: A first terminal obtains packet delay budget adjustment information, where the packet delay budget adjustment information is used to indicate an adjusted packet delay budget, a packet delay budget adjustment amount, or a packet delay budget adjustment range.

In an embodiment of this application, a packet delay budget is a maximum value of a delay between the first terminal and a policy and charging enforcement function (PCEF) entity, a maximum value of an air interface transmission delay between the first terminal and a first network device, a delay caused after one time of air interface transmission, or an average value of delays caused after a plurality of times of air interface transmission. The first network device may be a RAN device that connects the first terminal to a wireless network (for example, to a CN). In this case, the air interface transmission delay between the first terminal and the first network device is an air interface delay between the first terminal and the RAN device.

In an embodiment of this application, "adjustment" may also be referred to as "change". In this application, "adjustment" and "change" may be interchangeable, and are not distinguished from each other in this application. For example, the adjusted packet delay budget may also be referred to as a changed packet delay budget. For another example, the packet delay budget adjustment amount may also be referred to as a packet delay budget change amount, and specifically means a packet delay budget increase amount or a packet delay budget decrease amount. For another example, the packet delay budget adjustment range may also be referred to as a packet delay budget change range. Specifically, the packet delay budget change range may be a change range of the packet delay budget, or may be a change range of the packet delay budget change amount. This is not limited in this application.

It should be noted that the packet delay budget adjustment amount may be a positive value or a negative value. When the packet delay budget adjustment amount is a positive value, the packet delay budget adjustment amount indicates an increase amount of the packet delay budget, or when the packet delay budget adjustment amount is a negative value, the packet delay budget adjustment amount indicates a decrease amount of the packet delay budget.

Optionally, after receiving the packet delay budget adjustment amount, the first terminal may determine the adjusted packet delay budget based on the packet delay budget adjustment amount. For example, when the packet delay budget adjustment amount is a positive value, the first terminal may use a sum of a predefined packet delay budget (for example, defined by an operator) and the packet delay budget adjustment amount as the adjusted packet delay budget of the first terminal. For another example, when the packet delay budget adjustment amount is a positive value, the first terminal may use a sum of a statistical packet delay budget and the packet delay budget adjustment amount as the adjusted packet delay budget of the first terminal. For another example, when the packet delay budget adjustment amount is a positive value, the first terminal may use a sum of a packet delay budget of latest transmission and the packet delay budget adjustment amount as the adjusted packet delay budget of the first terminal.

It may be understood that the packet delay budget adjustment information is information that can represent a network quality status. Certainly, the information that can represent a network quality status is not limited to the packet delay budget adjustment information.

It should be noted that the packet delay budget adjustment information may be uplink or downlink adjustment information. For example, when the first terminal is a data receive end, the packet delay budget adjustment information is the downlink adjustment information; otherwise, when the first terminal is a data transmit end, the packet delay budget adjustment information is the uplink adjustment information.

After obtaining the packet delay budget adjustment information, the first terminal performs the following operations:

S120: The first terminal adjusts a size of a jitter buffer based on the packet delay budget adjustment information.

For example, the packet delay budget adjustment information indicates the adjusted packet delay budget. When the adjusted packet delay budget is increased, the first terminal increases the size of the jitter buffer; otherwise, when the adjusted packet delay budget is decreased, the first terminal decreases the size of the jitter buffer.

For example, the packet delay budget adjustment information indicates the packet delay budget adjustment amount. When the packet delay budget adjustment amount is a positive value, the first terminal increases the size of the jitter buffer; otherwise, when the packet delay budget adjustment amount is a negative value, the first terminal decreases the size of the jitter buffer.

In a possible implementation, before adjusting the size of the jitter buffer based on the packet delay budget adjustment amount, the first terminal may further determine whether the packet delay budget adjustment amount exceeds a predefined threshold or a network-configured threshold. For example, when the packet delay budget adjustment amount exceeds the predefined threshold or the network-configured threshold, the first terminal adjusts the size of the jitter buffer based on the obtained packet delay budget adjustment amount.

For example, the packet delay budget adjustment information indicates the packet delay budget adjustment range. When the packet delay budget adjustment range refers to the change range of the packet delay budget or the change range of the packet delay budget change amount, the first terminal determines an amount to be increased or decreased for the size of the jitter buffer based on the change range of the packet delay budget or the change range of the packet delay budget change amount. Specifically, whether the first terminal increases or decreases the size of the jitter buffer depends on whether the adjusted packet delay budget is increased or decreased. If the adjusted packet delay budget is increased, the first terminal increases the size of the jitter buffer; otherwise, if the adjusted packet delay budget is decreased, the first terminal decreases the size of the jitter buffer.

For example, when the first terminal determines, based on the packet delay budget adjustment information, that the packet delay budget is increased by 50 ms, the first terminal may increase a local delay jitter obtained through statistics collection by 50 ms to obtain an adjusted delay jitter, use the adjusted delay jitter as an input parameter for adjusting the jitter buffer, and adjust the size of the jitter buffer.

For another example, when the first terminal determines, based on the packet delay budget adjustment information, that the packet delay budget value is 150 ms, the first terminal may refer to a local end-to-end delay value obtained through statistics collection, use a difference between the two values as an input parameter for adjusting the jitter buffer, and adjust the size of the jitter buffer.

For another example, when the first terminal determines, based on the packet delay budget adjustment information, that the packet delay budget adjustment range is 20 ms to 50 ms, the first terminal may increase a local delay jitter obtained through statistics collection by 50 ms to obtain an adjusted delay jitter, use the adjusted delay jitter as an input parameter for adjusting the jitter buffer, and adjust the size of the jitter buffer.

It should be noted that the first terminal may further adjust the depth of the jitter buffer with reference to another factor such as a packet loss rate. For example, the depth of the jitter buffer is adjusted when at least one or more of the following conditions are met:

When the packet loss rate is higher than a predefined threshold or a network-configured threshold, and the delay jitter is lower than a predefined threshold, the size of the jitter buffer is increased.

When the packet loss rate is less than a predefined threshold or a network-configured threshold, and the delay jitter is greater than a predefined threshold, the size of the jitter buffer may not be adjusted.

When the packet loss rate is less than a predefined threshold or a network-configured threshold, and an end-to-end delay is less than a predefined threshold, the size of the jitter buffer may be increased.

When the packet loss rate is less than a predefined threshold or a network-configured threshold, and an end-to-end delay is greater than a predefined threshold, the size of the jitter buffer may not be adjusted.

Optionally, the packet loss rate may be a packet loss rate of data packets of an application layer, or may be a packet loss rate of data packets of a PDCP layer, an RLC layer, or a MAC layer. For example, the packet loss rate may be a packet loss rate of PDCP PDUs, RLC PDUs or MAC PDUs.

The foregoing conditions may be separately used, or may be completely or partially used. In addition, the foregoing condition may be used in combination with another condition. When the foregoing condition is used in combination with the another condition, the condition is a necessary condition rather than a sufficient condition, and shall fall within the protection scope of this application.

S130: The first terminal buffers data based on the adjusted jitter buffer. After adjusting the jitter buffer based on the packet delay budget adjustment information, the first terminal buffers the data based on the adjusted jitter buffer.

In the data processing method provided in this application, because the packet delay budget adjustment information can represent a network quality status, the first terminal in this application can perceive the network quality status in time based on the obtained packet delay budget adjustment information, rather than perceive the network quality status based on information such as a packet loss rate and a delay jitter that are obtained through statistics collection in a period of time, as it does in the prior art. In other words, the first terminal in this application can perceive the network quality status in time, and can quickly adjust the size of the jitter buffer based on the packet delay budget adjustment information.

How the first terminal obtains the packet delay budget adjustment information is not limited in this embodiment of this application. In a possible implementation, the first terminal receives the packet delay budget adjustment information sent by the first network device or a second terminal. For details, refer to S110a to S110d. In another possible implementation, the first terminal receives a configuration parameter sent by the first network device or the second terminal. The configuration parameter is related to an air interface transmission delay. The first terminal determines the packet delay budget adjustment information based on the configuration parameter. For details, refer to S110a' to S110e'.

In this application, that the configuration parameter is related to the air interface transmission delay means: the configuration parameter affects the air interface transmission delay. For example, if the configuration parameter changes, the air interface transmission delay changes.

In this application, the second terminal may be a terminal that communicates with the first terminal. The first terminal and the second terminal are used to distinguish between a receive end and a transmit end in communication. When the first terminal is the transmit end, the second terminal is the receive end. When the first terminal is the receive end, the second terminal is the transmit end. In an embodiment of this application, an example in which the first terminal is the receive end and the second terminal is the transmit end is used for description.

The following describes in detail that the first terminal obtains the packet delay budget adjustment information by receiving the packet delay budget adjustment information sent by the first network device or the second terminal.

S110a: The first network device determines the packet delay budget adjustment information.

In an embodiment of this application, the first network device may determine the packet delay budget adjustment information in the following manners:

In an implementation, the first network device may determine the packet delay budget adjustment information based on a current network quality status or a currently known influencing factor that influences the network quality status. For example, the first network device may determine the packet delay budget adjustment information based on information such as statistics about a locally collected packet loss rate and a transmission delay of a data packet.

In still another implementation, the first network device may determine the packet delay budget adjustment information based on first packet delay budget information sent by the first terminal.

In still another implementation, the first network device may determine the packet delay budget adjustment information based on a first end-to-end delay or a first packet loss rate that are sent by the first terminal. To be specific, the first network device may determine the packet delay budget adjustment information by using the first end-to-end delay or the first packet loss rate instead of the first packet delay budget information, so that a calculation amount of the first terminal can be reduced, and power consumption of the first terminal can be reduced.

In still another implementation, the first network device determines the packet delay budget adjustment information based on any combination of the first packet delay budget information, the first end-to-end delay, and the first packet loss rate that are sent by the first terminal, so that the determined packet delay budget adjustment information is more accurate. In this implementation, before determining the packet delay budget adjustment information, the first network device receives at least one of the first packet delay budget information, the first end-to-end delay, and the first packet loss rate that are sent by the first terminal.

Certainly, the first network device may alternatively determine the packet delay budget adjustment information based on a currently known affecting factor that affects the network quality status and with reference to at least one of the first packet delay budget information, the first end-to-end delay, and the first packet loss rate that are sent by the first terminal.

In still another implementation, the first network device may negotiate with a second network device to determine the packet delay budget adjustment information. The first network device may negotiate with the second network device to determine the packet delay budget adjustment information in the following manner:

The first network device receives at least one of second packet delay budget information, a second end-to-end delay, and a second packet loss rate that are sent by the second network device or the second terminal, and determines the packet delay budget adjustment information based on at least one of the first packet delay budget information, the first end-to-end delay, and the first packet loss rate, and at least one of the second packet delay budget information, the second end-to-end delay, and the second packet loss rate. In an embodiment of this application, the second network device may be a RAN device that connects the second terminal to a wireless network (for example, to a CN).

It may be understood that when the first terminal and the second terminal are served by a same network device (for example, the first network device), the first network device may directly obtain at least one of the second packet delay budget information, the second end-to-end delay, and the second packet loss rate that are sent by the second terminal.

Certainly, alternatively, the first network device may separately use at least one of the second packet delay budget information, the second end-to-end delay, and the second packet loss rate, to determine the packet delay budget adjustment information.

It should be noted that when the first terminal and the second terminal are served by a same network device, that is, when the first network device and the second network device are same network devices, a negotiation process between the first network device and the second network device (that is, a process in which the second network device sends at least one of the second packet delay budget information, the second end-to-end delay, and the second packet loss rate to the first network device) may be omitted. Specifically, assume that both the first terminal and the second terminal are served by the first network device. The first network device may directly receive at least one of the second packet delay budget information, the second end-to-end delay, and the second packet loss rate that are sent by the second terminal, and further determines the packet delay budget adjustment information with reference to at least one of the first packet delay budget information, the first end-to-end delay, and the first packet loss rate that are sent by the first terminal.

Optionally, at least one of the second packet delay budget information, the second end-to-end delay, and the second packet loss rate may be sent by a core network device or a server to the first network device. In this implementation, the core network device or the server may obtain the foregoing information from the second terminal or the second network device. For example, the second terminal sends the packet delay budget adjustment information to the core network device (for example, an IMS node, where the IMS node may learn that the first terminal and the second terminal are two ends of a voice call), and the core network device sends the packet delay budget adjustment information to the first network device. For another example, the second terminal sends the packet delay budget adjustment information to the server, the server sends the received packet delay budget adjustment information to the core network device, and the core network device sends the packet delay budget adjustment information to the first network device.

Optionally, the first network device may determine the packet delay budget adjustment information for different logical channels or services of the first terminal.

The first packet delay budget information includes a packet delay budget adjustment amount, a packet delay budget adjustment range, or a packet delay budget expected by the first terminal. It may be understood that the packet delay budget adjustment amount, the packet delay budget adjustment range, or the packet delay budget expected by the first terminal may be a packet delay budget adjustment amount, a packet delay budget adjustment range, or a packet delay budget configured by the first network device for the first terminal, as requested by the first terminal.

In a possible implementation, the first packet delay budget information is carried in a first delay budget adjustment report.

Optionally, the first end-to-end delay and the first packet loss rate may be carried in the first delay budget adjustment report and sent to the first network device, or may be separately sent to the first network device as auxiliary information.

The second packet delay budget information includes the packet delay budget adjustment amount, the packet delay budget adjustment range, or the packet delay budget expected by the second terminal. It may be understood that the packet delay budget adjustment amount, the packet delay budget adjustment range, or the packet delay budget expected by the second terminal may be a packet delay budget adjustment amount, a packet delay budget adjustment range, or a packet delay budget configured by the second network device for the second terminal, as requested by the second terminal.

In a possible implementation, the second packet delay budget information is carried in a second delay budget adjustment report.

Optionally, the second end-to-end delay and the second packet loss rate may be carried in the second delay budget adjustment report and sent to the second network device, or may be separately sent to the second network device as auxiliary information.

The first end-to-end delay and the second end-to-end delay are delays between the first terminal and the second terminal (end to end, E2E). The first packet loss rate is a packet loss rate obtained through statistics collection by the first terminal, and the second packet loss rate is a packet loss rate obtained through statistics collection by the second terminal.

S110$b$: The first terminal receives the packet delay budget adjustment information sent by the first network device.

S110$c$: The second terminal determines the packet delay budget adjustment information.

In an implementation, the second terminal determines the packet delay budget adjustment information based on a current network quality status or a currently known influencing factor that influences the network quality status.

In still another implementation, the second terminal receives first packet delay budget adjustment information sent by the second network device, and determines the first packet delay budget adjustment information as the packet delay budget adjustment information. The first packet delay budget adjustment information is used to indicate an adjusted first packet delay budget, a first packet delay budget adjustment amount, or a first packet delay budget adjustment range. In this implementation, the second network device may determine the first packet delay budget adjustment information in the following two manners:

Manner 1: The second network device determines the first packet delay budget adjustment information based on the current network quality status or the currently known affecting factor that affects the network quality status.

Manner 2: The second network device determines the first packet delay budget adjustment information based on at least one of the second packet delay budget information, the second end-to-end delay, and the second packet loss rate that are sent by the second terminal. In this implementation, before determining the first packet delay budget adjustment information, the second network device receives at least one of the second packet delay budget information, the second end-to-end delay, and the second packet loss rate that are sent by the second terminal.

S110$d$: The first terminal receives the packet delay budget adjustment information sent by the second terminal.

After receiving the packet delay budget adjustment information, the first terminal sends the packet delay budget adjustment information to an application layer of the first terminal for processing.

Optionally, when receiving the packet delay budget adjustment information and a voice data packet, the first terminal determines, based on the received packet delay budget adjustment information, an amount of the size of the jitter buffer to be adjusted, and then processes the voice data packet, to reduce discarding of the data packet due to a large delay jitter.

In an embodiment of this application, the second terminal may send the packet delay budget adjustment information to the first terminal in the following manners:

In an implementation, the second terminal sends the packet delay budget adjustment information to the first terminal via an application layer message. The application layer message may include a real-time transport control protocol (RTCP)/real-time transport protocol (RTP) codec mode request (CMR) message or data packet.

In still another implementation, the second terminal sends the packet delay budget adjustment information to the first terminal via the second network device. In this implementation, the second terminal sends the determined packet delay budget adjustment information to the second network device, and the second network device sends the received packet delay budget adjustment information to the first terminal.

In still another implementation, the second terminal sends the packet delay budget adjustment information to the first terminal via the second network device and the first network device. In this implementation, the second terminal sends the determined packet delay budget adjustment information to the second network device, the second network device sends the received packet delay budget adjustment information to the first network device, and the first network device further sends the received packet delay budget adjustment information to the first terminal.

It should be noted that, in a process of establishing a session between the second terminal and the first terminal, the first network device need to notify the second network device of IP address information of the first network device over an IMS network. In this way, after receiving the packet delay budget adjustment information sent by the second terminal, the second network device sends the packet delay budget adjustment information to the first network device based on the obtained IP address information of the first network device, and the first network device further sends the packet delay budget adjustment information to the first terminal.

It should be further noted that when the first terminal and the second terminal are served by a same network device, the second terminal may send the packet delay budget adjustment information to the first terminal via the network device.

It may be understood that the foregoing different steps may be used in different application scenarios. For example, when an air interface transmission delay between the first terminal and the first network device changes, the first terminal may use the implementation of S110$a$ to S110$b$. When an air interface transmission delay between the second terminal and the second network device changes, the first terminal may use the implementation of S110$c$ to S110$d$. Certainly, if both the air interface transmission delay between the first terminal and the first network device and the air interface transmission delay between the second terminal and the second network device change, the first terminal may use the implementation of S110a to S110d. In this case, the first terminal may comprehensively consider the packet delay budget adjustment information sent by the second terminal and the first network device, and then makes a decision of adjusting the jitter buffer.

The following describes in detail that the first terminal obtains the packet delay budget adjustment information by receiving the configuration parameter sent by the first network device or the second terminal.

S110a': The first network device determines the configuration parameter, where the configuration parameter is related to an air interface transmission delay.

In this application, the configuration parameter may include at least one of a discontinuous reception (DRX) cycle, preset duration of a PDCP discard timer, and a coverage enhancement parameter. The coverage enhancement parameter may include a quantity of times of repeatedly sending a data packet. The preset duration of the PDCP discard timer refers to a time for which a PDCP SDU packet is buffered in a PDCP entity. Specifically, after receiving the PDCP SDU packet from a higher layer, the PDCP entity starts the PDCP discard timer. When the PDCP discard timer expires, the PDCP entity discards the PDCP SDU packet and a PDCP PDU generated from the PDCP SDU.

It should be noted that the first network device may determine the configuration parameter in a manner the same as that used in determining the packet delay budget adjustment information. For details, refer to the description of S110a. Details are not described herein again.

For example, the first network device may determine a value of the DRX cycle to be decreased, depending on that radio signal quality is higher than a predefined threshold. For another example, the first network device may determine the value of the DRX cycle to be decreased based on one or more parameters of: a DRX cycle decrease amount expected by the first terminal, a predefined packet delay budget less than a predefined threshold, a first end-to-end delay greater than a predefined threshold, and a first packet loss rate less than a predefined threshold. For another example, the first network device may determine the quantity of times of repeatedly sending a data packet based on one or more of the following parameters: the radio signal quality higher than the predefined threshold, an increase quantity of times of repeatedly sending a data packet expected by the first terminal, the predefined packet delay budget lower than the predefined threshold, and the first packet loss rate higher than the predefined threshold.

S110b': The first terminal receives the configuration parameter sent by the first network device.

S110c': The second terminal determines a configuration parameter, where the configuration parameter is related to the air interface transmission delay.

It should be noted that the second terminal may determine the configuration parameter in a manner the same as that used in determining the packet delay budget adjustment information. For details, refer to the description of S110c. Details are not described herein again.

S110d': The first terminal receives the configuration parameter sent by the second terminal.

After receiving the configuration parameter, the first terminal sends the configuration parameter to an application layer of the first terminal for processing.

It should be noted that the second terminal may send the configuration parameter in a manner the same as that used in sending the packet delay budget adjustment information. For details, refer to the description of S110d. Details are not described herein again.

S110e': The first terminal determines the packet delay budget adjustment information based on the configuration parameter. Specifically, the first terminal determines the packet delay budget adjustment information based on the configuration parameter sent by the first network device or the second terminal.

For example, when the configuration parameter is the DRX cycle, assuming that a DRX cycle length before adjustment is 1280 ms, only 1 ms in 1280 ms is used for receiving downlink scheduling; assuming that a DRX cycle after adjustment is 10 ms, 1 ms in 10 ms is used for receiving downlink scheduling. In this case, a packet delay budget for downlink receiving is decreased by 1270 ms.

For another example, when the configuration parameter is the quantity of times of repeatedly sending a data packet, assuming that the quantity of times of repeatedly sending a data packet by the first terminal before adjustment is 0, and the quantity of times of repeatedly sending a data packet by the first terminal after adjustment is 5 (including onetime of initial transmission), in this case, the packet delay budget is increased by time of four transmission units.

For another example, when the configuration parameter is the preset duration of the PDCP discard timer, when the duration of the PDCP discard timer is increased by 10 ms, the packet delay budget is also increased correspondingly, for example, increased by 10 ms correspondingly.

It may be understood that the foregoing different steps may be used in different application scenarios. For example, when the air interface transmission delay between the first terminal and the first network device changes, the first terminal may use the implementation of S110a', S110b', and S110e'. When the air interface transmission delay between the second terminal and the second network device changes, the first terminal may use the implementation of S110c, S110d', S110e'. Certainly, if both the air interface transmission delay between the first terminal and the first network device and the air interface transmission delay between the second terminal and the second network device change, the first terminal may use the implementation of S110a to S110e'. In this case the first terminal may comprehensively consider the configuration parameter sent by the second terminal and the first network device, to determine the packet delay budget adjustment information and make a decision of adjusting the jitter buffer.

Figure 8:
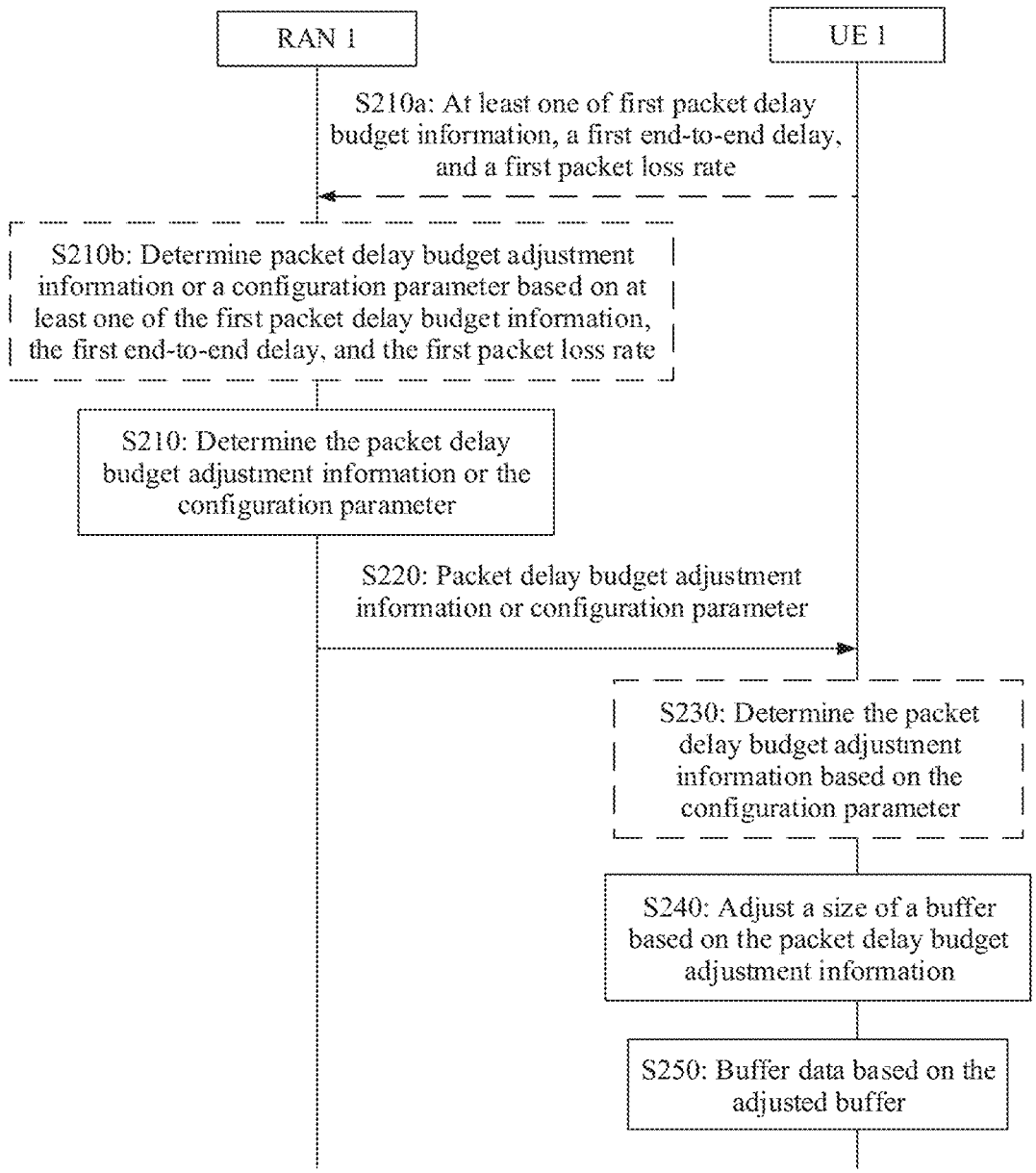
FIG. 8 is an implementation flowchart of another data processing method according to an embodiment of this application.
Figure 9:
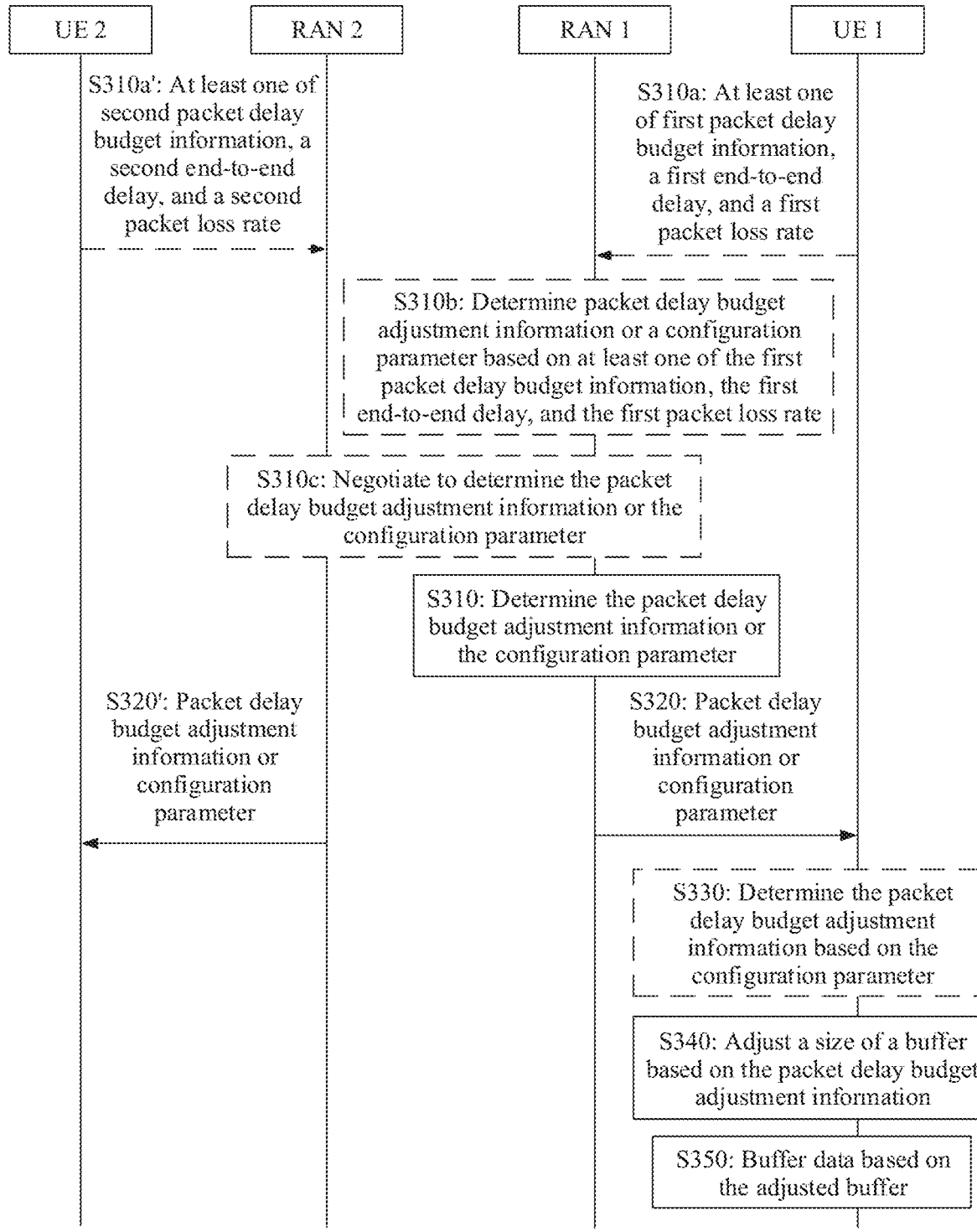
FIG. 9 is an implementation flowchart of still another data processing method according to an embodiment of this application.
Figure 10A:
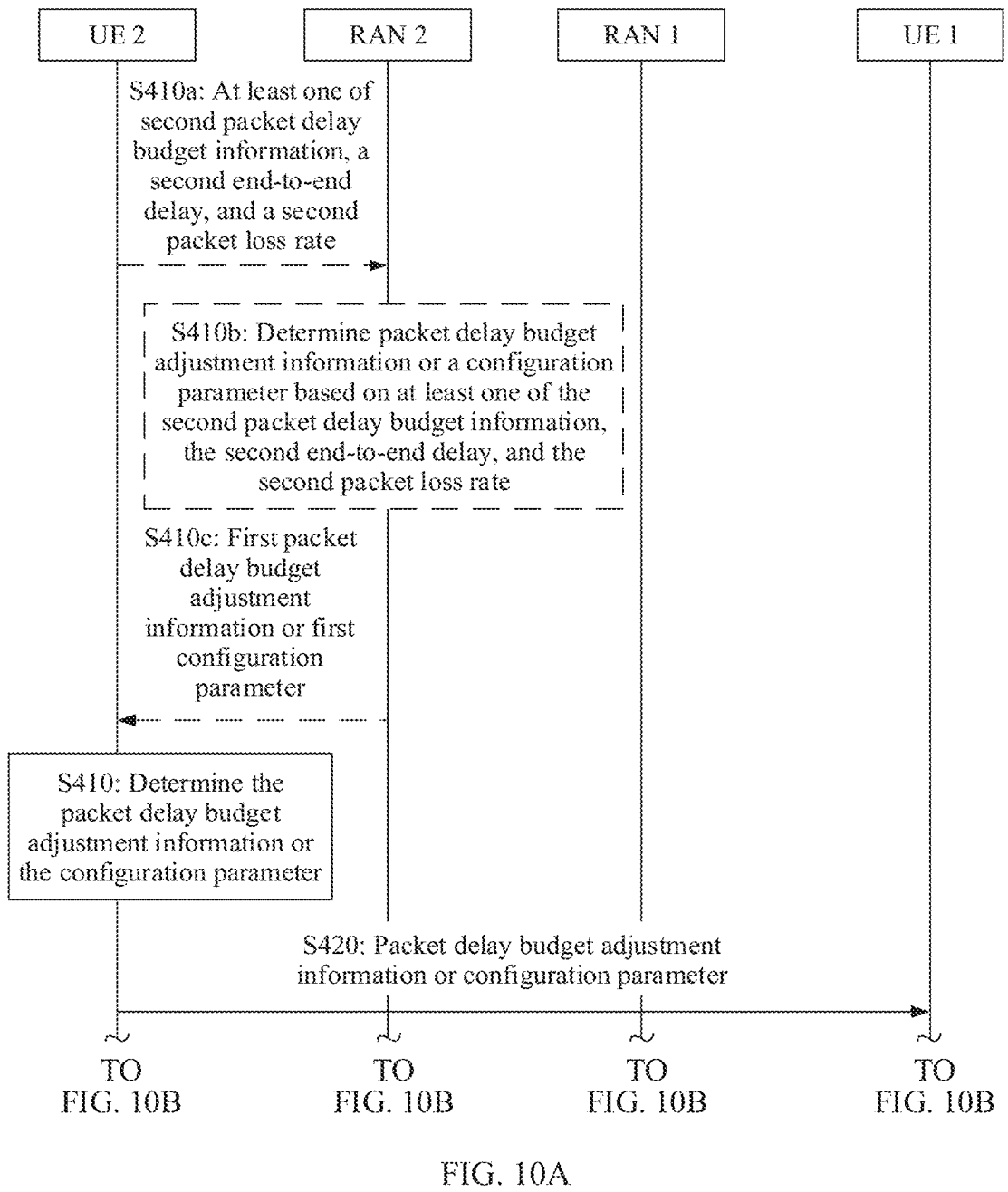
FIG. 10A and FIG. 10B are an implementation flowchart of still another data processing method according to an embodiment of this application.
Figure 10B:
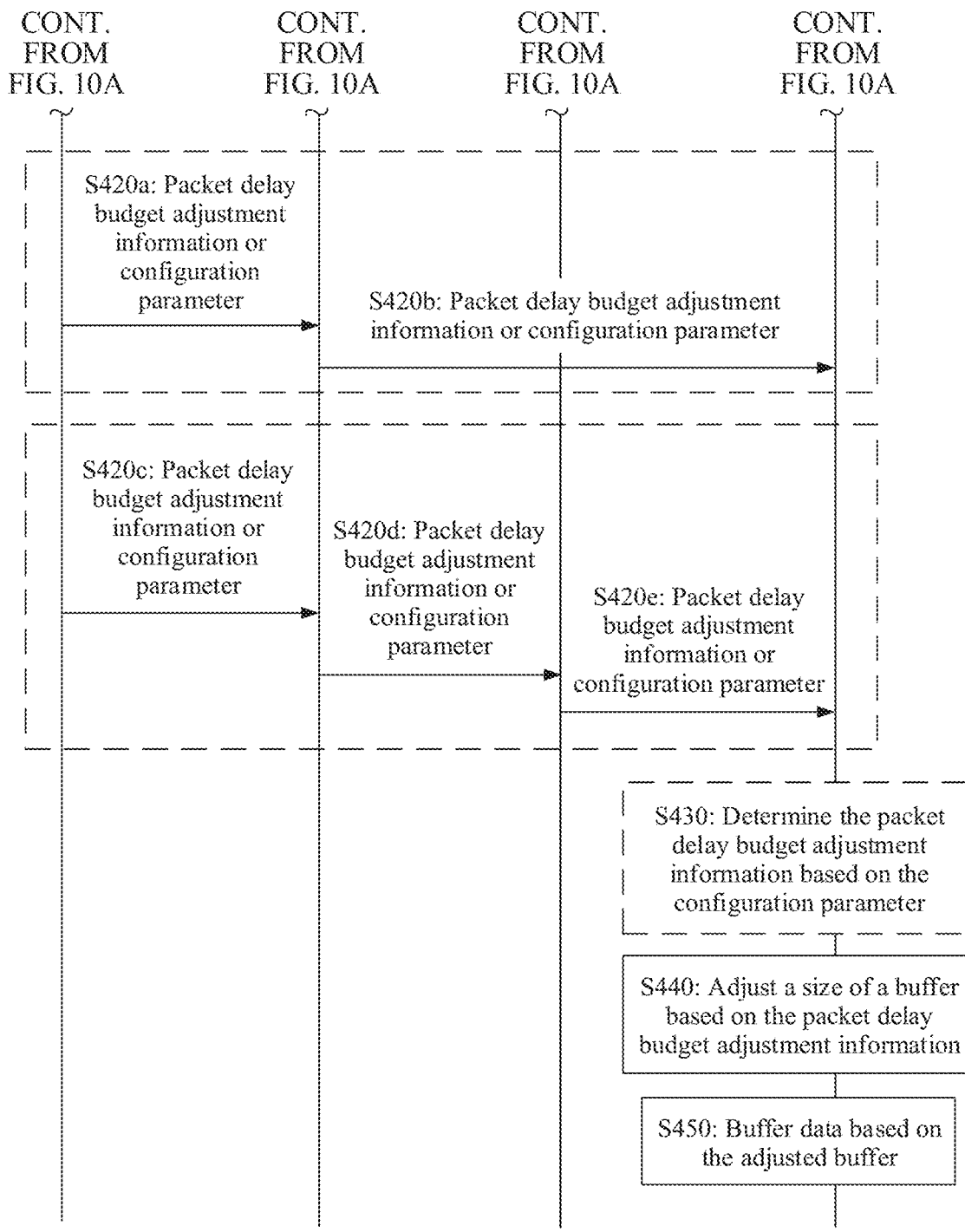

The following describes the data processing method provided in this application with reference to FIG. 8 to FIG. 10 by using examples.

FIG. 8 is an implementation flowchart of another data processing method according to an embodiment of this application. In FIG. 8, an example in which the first terminal is UE 1, the first network device is a RAN 1, and the first terminal obtains the packet delay budget adjustment information from the first network device is used for description. As shown in FIG. 8, the method includes the following steps.

S210: The RAN 1 determines the packet delay budget adjustment information or a configuration parameter.

In an implementation, the RAN 1 determines the packet delay budget adjustment information or the configuration parameter based on a current network quality status or a currently known affecting factor that affects the network quality status.

In still another implementation, the RAN 1 determines the packet delay budget adjustment information or the configuration parameter based on at least one of first packet delay budget information, a first end-to-end delay, and a first packet loss rate that are reported by the UE 1. Refer to S210a to S210b.

S220: The RAN 1 sends the packet delay budget adjustment information or the configuration parameter to the UE 1. If the RAN 1 sends the configuration parameter to the UE 1, the UE 1 further performs S230.

S230: The UE 1 determines the packet delay budget adjustment information based on the configuration parameter.

S240: The UE 1 adjusts a size of a jitter buffer based on the packet delay budget adjustment information.

S250: The UE 1 buffers data based on the adjusted jitter buffer.

Optionally, the method shown in FIG. 8 may be applied to a scenario in which an air interface transmission delay between the UE 1 and the RAN 1 changes.

FIG. 9 is an implementation flowchart of another data processing method according to an embodiment of this application. In FIG. 9, an example in which the first terminal is UE 1, the second terminal is UE 2, the first network device is a RAN1, the second network device is a RAN 2, and the first terminal obtains the packet delay budget adjustment information from the first network device is used for description. As shown in FIG. 9, the method includes the following steps.

S310: The RAN 1 determines the packet delay budget adjustment information or a configuration parameter.

In an implementation, the RAN 1 determines the packet delay budget adjustment information or the configuration parameter based on a current network quality status or a currently known affecting factor that affects the network quality status.

In still another implementation, the RAN 1 determines the packet delay budget adjustment information or the configuration parameter based on at least one of first packet delay budget information, a first end-to-end delay, and a first packet loss rate that are reported by the UE 1. Refer to S310a to S310b.

In still another implementation, the RAN 1 and the RAN 2 negotiate to determine the packet delay budget adjustment information or the configuration parameter. Refer to S310c. Optionally, the RAN 1 determines the packet delay budget adjustment information or the configuration parameter based on at least one of second packet delay budget information, a second end-to-end delay, and a second packet loss rate that are sent by the RAN 2, and at least one of the first packet delay budget information, the first end-to-end delay, and the first packet loss rate. In this implementation, after the RAN 1 negotiates with the RAN 2 to determine the packet delay budget adjustment information or the configuration parameter, the RAN 1 and the RAN 2 may send the negotiated packet delay budget adjustment information or configuration parameter to the UE 1 and the UE 2 respectively. Refer to S320 and S320'. It should be noted that the packet delay budget adjustment information or the configuration parameter sent in S320 and S320' may be different values.

S320: The RAN 1 sends the packet delay budget adjustment information or the configuration parameter to the UE 1. If the RAN 1 sends the configuration parameter to the UE 1, the UE 1 further performs S330.

S330: The UE 1 determines the packet delay budget adjustment information based on the configuration parameter.

S340: The UE 1 adjusts a size of a jitter buffer based on the packet delay budget adjustment information.

S350: The UE 1 buffers data based on the adjusted jitter buffer.

FIG. 10 is an implementation flowchart of another data processing method according to an embodiment of this application. In FIG. 10, an example in which the first terminal is UE 1, the second terminal is UE 2, the first network device is a RAN1, the second network device is a RAN 2, and the first terminal obtains the packet delay budget adjustment information from the second terminal is used for description. As shown in FIG. 10, the method includes the following steps.

S410: The UE 2 determines the packet delay budget adjustment information or a configuration parameter.

In an implementation the UE 2 determines the packet delay budget adjustment information or the configuration parameter based on a current network quality status or a currently known affecting factor that affects the network quality status.

In still another implementation, the UE 2 determines first packet delay budget adjustment information or a first configuration parameter sent by the RAN 2 as the packet delay budget adjustment information or the configuration parameter. It should be noted that the first packet delay budget adjustment information or the first configuration parameter sent by the RAN 2 to the UE 2 may be determined by the RAN 2 based on the current network quality status or the currently known affecting factor that affects the network quality status, or may be determined by the RAN 2 based on at least one of second packet delay budget information, a second end-to-end delay, and a second packet loss rate that are reported by the UE 2. Refer to S410a to S410c.

S420: The UE 2 sends the packet delay budget adjustment information or the configuration parameter to the UE 1. If the RAN 1 sends the configuration parameter to the UE 1, the UE 1 further performs S430.

An occasion for performing S420 is not limited in this embodiment of this application.

When determining that at least one or more of the following conditions are met, the UE 2 triggers execution of S420.

Condition 1: The UE 2 determines that at least a packet delay budget change amount is greater than or equal to a predefined threshold or a network-configured threshold.

Condition 2: The UE 2 determines that at least radio signal quality is lower than a predefined threshold or a network-configured threshold.

Condition 3: The UE 2 determines that at least a packet loss rate is greater than or equal to a predefined threshold or a network-configured threshold.

The foregoing conditions may be separately used, or may be completely or partially used. In addition, the foregoing condition may be used in combination with another condition. When the foregoing condition is used in combination with the another condition, the condition is necessary condition rather than sufficient condition, and shall fall within the protection scope of this application.

Optionally, when both a voice service data packet and the packet delay budget adjustment information are to-be-transmitted data, the UE 2 preferentially sends the packet delay budget adjustment information, or places the packet delay budget adjustment information in the voice service data packet and sends the packet delay budget adjustment information together with the voice service data packet.

The UE 2 may send the packet delay budget adjustment information or the configuration parameter to the UE 1 in three manners. Refer to S420, S420a to S420b, and S420c to S420e.

S430: The UE 1 determines the packet delay budget adjustment information based on the configuration parameter.

S440: The UE 1 adjusts a size of a jitter buffer based on the packet delay budget adjustment information.

S450: The UE 1 buffers data based on the adjusted jitter buffer.

Optionally, the method shown in FIG. 10 may be applied to a scenario in which an air interface transmission delay between the UE 2 and the RAN 2 changes.

According to the data processing method provided in this embodiment of this application, a receive end can perceive the network quality status in time based on the obtained packet delay budget adjustment information, and can quickly adjust the size of the jitter buffer based on the packet delay budget adjustment information, thereby improving voice quality and improving user experience.

The foregoing mainly describes the solutions provided in the embodiments of this application from a perspective of interaction between the first terminal and the first network device, or between the first terminal and the second terminal. It may be understood that, to implement the foregoing functions, the first terminal, the second terminal, and the first network device include corresponding hardware structures and/or software modules for performing the functions. With reference to the units and algorithm steps described in the embodiments disclosed in this application, the embodiments of this application can be implemented in a form of hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation falls beyond the scope of the technical solutions in the embodiments of this application.

In the embodiments of this application, function unit division may be performed on the first terminal, the second terminal, and the first network device based on the foregoing method examples. For example, each function unit may be obtained through division based on a corresponding function, or two or more functions may be integrated into one processing unit. The integrated unit may be implemented in a form of hardware, or may be implemented in a form of a software functional unit.

Based on a same inventive concept, an embodiment of this application further provides an apparatus for implementing any one of the foregoing methods, for example, an apparatus including units configured to implement the steps performed by the first terminal or the second terminal in any one of the foregoing methods. For another example, another apparatus is further provided, including units configured to implement the steps performed by the first network device or the second network device in any one of the foregoing methods.

Figure 11:
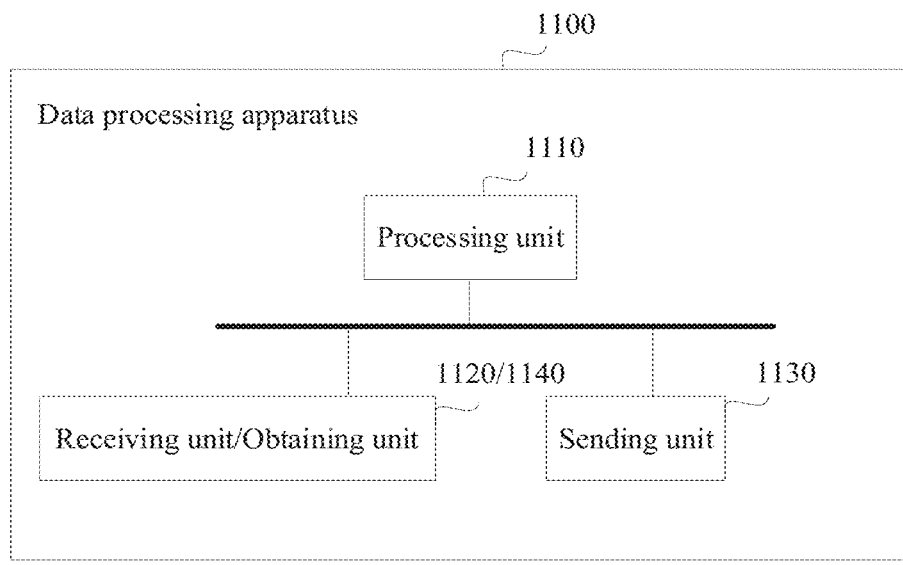
FIG. 11 is a schematic diagram of a data processing apparatus according to an embodiment of this application.

In a possible implementation, an embodiment of this application provides a data processing apparatus 100. The data processing apparatus 100 may be applied to the first terminal or the second terminal. FIG. 11 is a schematic structural diagram of the data processing apparatus 100 according to an embodiment of this application. Referring to FIG. 11, the data processing apparatus 1100 includes a processing unit 1110, a sending unit 1130, and a receiving unit 1120 or an obtaining unit 1140. When the data processing apparatus 1100 is applied to the first terminal, the corresponding apparatus 1100 includes a processing unit 1110, a sending unit 1130, and an obtaining unit 1140. The obtaining unit 1140 is configured to obtain packet delay budget adjustment information. The processing unit 1110 is configured to: adjust a size of a jitter buffer based on the packet delay budget adjustment information obtained by the obtaining unit 1140, and buffer data based on the adjusted jitter buffer. When the data processing apparatus 1100 is applied to the second terminal, the corresponding apparatus 1100 includes a processing unit 1110, a receiving unit 1120, and a sending unit 1130. The processing unit 1110 is configured to determine packet delay budget adjustment information or a configuration parameter. The sending unit 1130 is configured to send the packet delay budget adjustment information or the configuration parameter determined by the processing unit 1110 to the first terminal.

Figure 12:
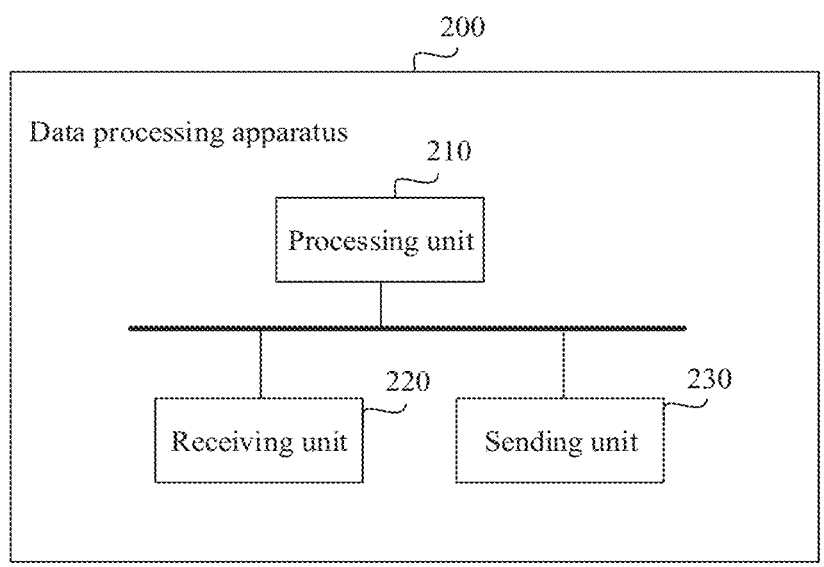
FIG. 12 is a schematic diagram of another data processing apparatus according to an embodiment of this application.

In another possible implementation, an embodiment of this application further provides a data processing apparatus 200. The data processing apparatus 200 may be applied to the first network device or the second network device. FIG. 12 is a schematic structural diagram of the data processing apparatus 200 according to an embodiment of this application. Referring to FIG. 12, the data processing apparatus 200 includes a processing unit 210, a receiving unit 220, and a sending unit 230. The processing unit 210 is configured to determine packet delay budget adjustment information or a configuration parameter. The sending unit 230 is configured to send the packet delay budget adjustment information or the configuration parameter determined by the processing unit 210 to the first terminal.

The packet delay budget adjustment information is used to indicate an adjusted packet delay budget, a packet delay budget adjustment amount, or a packet delay budget adjustment range. The configuration parameter is related to an air interface transmission delay, and may include at least one of a DRX cycle, preset duration of a PDCP discard timer, and a coverage enhancement parameter.

When the data processing apparatus 100 is applied to the first terminal or the second terminal, and the data processing apparatus 200 is applied to the first network device or the second network device, the following operations may be further performed:

In a possible design, the obtaining unit 140 receives the packet delay budget adjustment information sent by the first network device or the second terminal, and then a size of a jitter buffer is adjusted based on the received packet delay budget adjustment information. In this way, a network status can be perceived in time based on the packet delay budget adjustment information sent by the second terminal or the first network device, rather than the network status is determined based on statistics about parameters collected in a period of time in the prior art, so that the size of the jitter buffer can be adjusted quickly.

In another possible design, the obtaining unit 140 receives the configuration parameter sent by the first network device or the second terminal, determines the packet delay budget adjustment information based on the received configuration parameter, and the size of the jitter buffer is adjusted based on the determined packet delay budget adjustment information. In this way, the packet delay budget adjustment information can be determined quickly determined based on the received configuration parameter, so that the size of the jitter buffer can be adjusted quickly.

In still another possible design, before the obtaining unit 140 obtains the packet delay budget adjustment information, the sending unit 130 sends at least one of first packet delay budget information, a first end-to-end delay, and a first packet loss rate to the first network device. In this design, the processing unit 210 determines the packet delay budget adjustment information or the configuration parameter based on at least one of the first packet delay budget information, the first end-to-end delay, and the first packet loss rate. In this way, the determined packet delay budget adjustment information or configuration parameter is more accurate.

The first packet delay budget information includes the packet delay budget adjustment amount, the packet delay budget adjustment range, or the packet delay budget expected by the apparatus 100.

In still another possible design, the first packet delay budget information is carried in a first delay budget adjustment report.

In still another possible design, before the processing unit 210 determines the packet delay budget adjustment information or the configuration parameter, the receiving unit 220 receives at least one of second packet delay budget information, a second end-to-end delay, and a second packet loss rate that are sent by the second network device or the second terminal. In this design, the processing unit 210 can determine the packet delay budget adjustment information or the configuration parameter based on at least one of the first packet delay budget information, the first end-to-end delay, and the first packet loss rate, and at least one of the second packet delay budget information, the second end-to-end delay, and the second packet loss rate. According to the method, when determining the packet delay budget adjustment information or the configuration parameter, the data processing apparatus not only considers a network status at the local side, but also considers a network status of a peer end, so that the determined packet delay budget adjustment information or configuration parameter is more accurate.

The second packet delay budget information includes the packet delay budget adjustment amount, the packet delay budget adjustment range, or the packet delay budget of the second terminal that is expected by the second terminal or that is determined by the second network device.

In still another possible design, the second packet delay budget information is carried in a second delay budget adjustment report.

In still another possible design, before the processing unit 110 determines the packet delay budget adjustment information or the configuration parameter, the receiving unit 120 receives first packet delay budget adjustment information or a first configuration parameter sent by a network device that serves the second terminal. In this design, the processing unit 110 may determine the packet delay budget adjustment information or the configuration parameter in the following manner: determining the first packet delay budget adjustment information or the first configuration parameter as the packet delay budget adjustment information or the configuration parameter.

The first packet delay budget adjustment information is used to indicate an adjusted first packet delay budget, a first packet delay budget adjustment amount, or a first packet delay budget adjustment range, and the first configuration parameter is related to an air interface transmission delay.

In still another possible design, the first packet delay budget adjustment information or the first configuration parameter is determined by the network device based on at least one of the second packet delay budget information, the second end-to-end delay, and the second packet loss rate that are sent by the sending unit 130. In this design, before the receiving unit 120 receives the first packet delay budget adjustment information or the first configuration parameter, the sending unit 130 sends at least one of the second packet delay budget information, the second end-to-end delay, and the second packet loss rate to the network device.

The second packet delay budget information includes the packet delay budget adjustment amount, the packet delay budget adjustment range, or the packet delay budget expected by the second terminal.

In this application, the sending unit 130 may send the packet delay budget adjustment information or the configuration parameter to the first terminal in the following three manners:

Manner 1: The sending unit 130 sends the packet delay budget adjustment information or the configuration parameter to the first terminal via an application layer message.

Manner 2: The sending unit 130 sends the packet delay budget adjustment information or the configuration parameter to the first terminal via the second network device.

Manner 3: The sending unit 130 sends the packet delay budget adjustment information or the configuration parameter to the first terminal via the second network device and the first network device.

It should be understood that division into the units in the apparatus is merely division of logical functions. During actual implementation, all or some of the units may be integrated into a physical entity, or may be physically separated. In addition, the units in the apparatus all may be implemented by software invoked by a processing element, or all may be implemented by hardware, or some units may be implemented by software invoked by a processing element, and some units are implemented by hardware. For example, each unit may be an independently disposed processing element, or may be integrated into a chip of the apparatus for implementation. In addition, each unit may be stored in a memory in a form of a program, and a processing element of the apparatus invokes and executes a function of the unit. In addition, the units may be integrated together or may be individually implemented. The processing element described herein may alternatively be a processor, and may be an integrated circuit having a signal processing capability. In an implementation process, the steps of the foregoing methods or the foregoing units may be implemented by using an integrated logic circuit of hardware in the processing element, or may be implemented in a form of software invoked by the processing element.

In an example, the units in any apparatus above may be configured as one or more integrated circuits for implementing the foregoing methods, for example, one or more application-specific integrated circuits (ASIC), one or more microprocessors (digital signal processor, DSP), or one or more field programmable gate arrays (FPGA), or a combination of at least two of these integrated circuit forms. For another example, when the units in the apparatus may be implemented in a form of invoking a program by a processing element, the processing element may be a general-purpose processor, for example, a central processing unit (CPU) or another processor that can invoke a program. For another example, the units can be integrated together and implemented in a form of a system-on-a-chip (SOC).

The unit for receiving is an interface circuit of the apparatus, and is configured to receive a signal from another apparatus. For example, when the apparatus is implemented in a form of a chip, the receiving unit is an interface circuit that is of the chip and that is configured to receive a signal from another chip or apparatus. The unit for sending is an interface circuit of the apparatus, and is configured to send a signal to another apparatus. For example, when the apparatus is implemented in a form of a chip, the sending unit is an interface circuit that is of the chip and that is configured to send a signal to another chip or apparatus.

The first network device exchanges information with the second network device based on an interface protocol between the network devices, for example, receives at least one of the second packet delay budget information, the second end-to-end delay, and the second packet loss rate. The first network device and the second network device may be connected in a wired manner, or may be connected in a wireless manner. The first network device exchanges information with the first terminal based on an interface protocol between the first network device and a terminal, for example, receives at least one of the first packet delay budget information, the first end-to-end delay, and the first packet loss rate that are sent by the first terminal. The first network device is wirelessly connected to the first terminal. When the first network device also serves the second terminal, the first network device exchanges information with the second terminal through a wireless interface, for example, receives at least one of the second packet delay budget information, the second end-to-end delay, and the second packet loss rate. In this case, the first network device obtains information from the second network device and a terminal via different interfaces, and then the receiving unit obtains the information via an interface circuit inside the network device.

Figure 13:
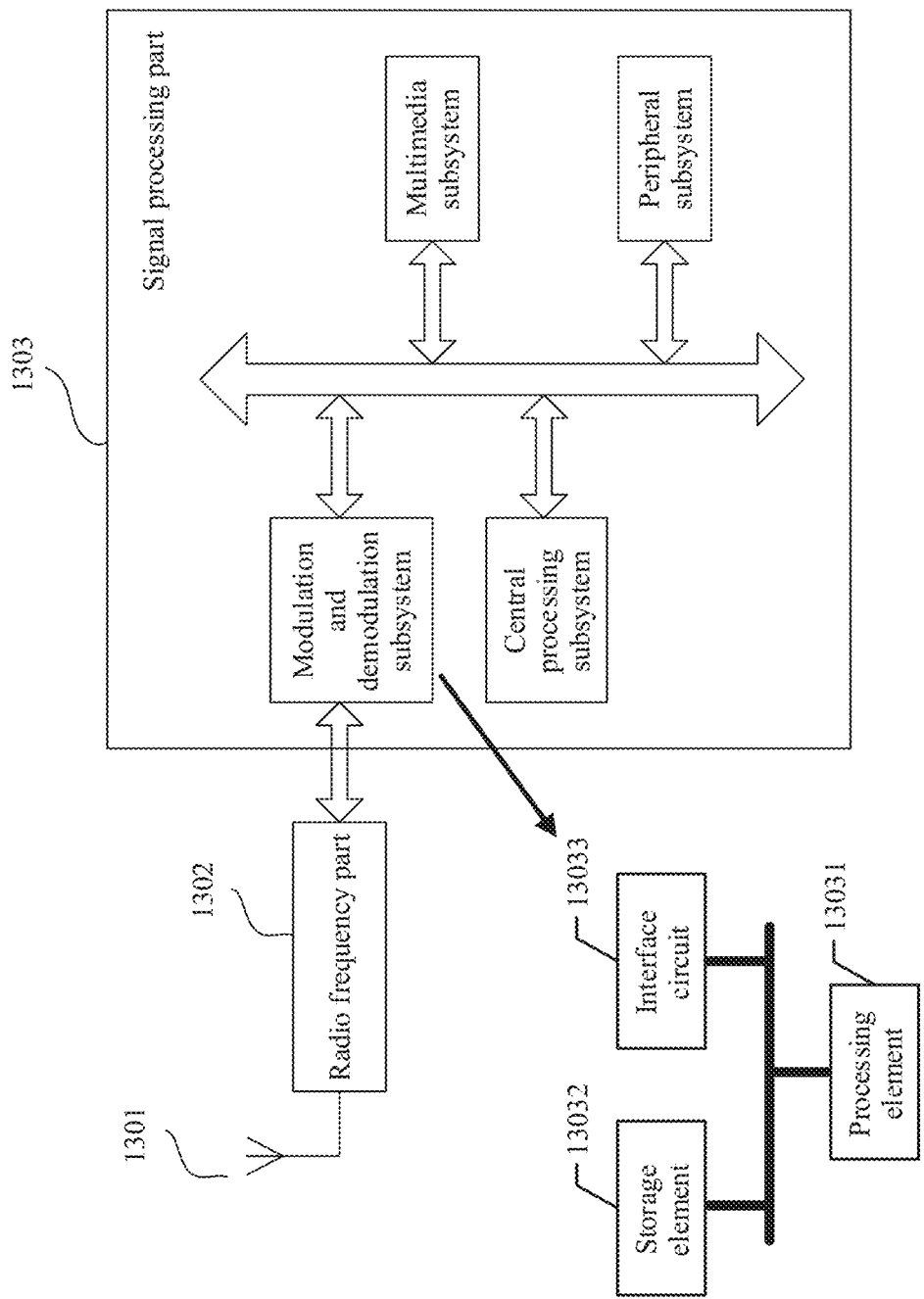
FIG. 13 is a schematic structural diagram of a terminal according to an embodiment of this application.

FIG. 13 is a schematic structural diagram of a terminal according to an embodiment of this application. The terminal may be the first terminal or the second terminal in the foregoing embodiments, and is configured to implement the operations of the first terminal or the second terminal in the foregoing embodiments. As shown in FIG. 13, the terminal includes an antenna 1301, a radio frequency part 1302, and a signal processing part 1303. The antenna 1301 is connected to the radio frequency part 1302. In a downlink direction, the radio frequency part 1302 receives, via the antenna 1301, information sent by a network device, and sends the information sent by the network device to the signal processing part 1303 for processing. In an uplink direction, the signal processing part 1303 processes information of the terminal, and sends the information to the radio frequency part 1302. The radio frequency part 1302 processes the information of the terminal, and then sends the processed information to the network device via the antenna 1301.

The signal processing part 1303 may include a modem subsystem, configured to process data at each communications protocol layer. The signal processing part 1303 may further include a central processing subsystem, configured to process an operating system and an application layer of the terminal. In addition, the signal processing part 1303 may further include another subsystem, for example, a multimedia subsystem and a peripheral subsystem. The multimedia subsystem is configured to control a terminal camera, a screen display, and the like. The peripheral subsystem is configured to connect to another device. The modem subsystem may be a separately disposed chip. Optionally, the foregoing apparatus applied to the terminal may be located in the modem subsystem.

The modem subsystem may include one or more processing elements 13031, for example, one main control CPU and another integrated circuit. In addition, the modem subsystem may further include a storage element 13032 and an interface circuit 13033. The storage element 13032 is configured to store data and a program. However, the program configured to perform the method performed by the terminal in the foregoing methods may not be stored in the storage element 13032, but is stored in a memory outside the modem subsystem. The program is loaded and used by the modem subsystem when being used. The interface circuit 13033 is configured to communicate with another subsystem. The foregoing apparatus applied to the terminal may be located in the modem subsystem. The modem subsystem may be implemented by a chip. The chip includes at least one processing element and an interface circuit. The processing element is configured to perform the steps of any method performed by the terminal, and the interface circuit is configured to communicate with another apparatus. In an implementation, units of the terminal that implement the steps in the foregoing methods may be implemented in a form of a program invoked by a processing element. For example, the apparatus applied to the terminal includes a processing element and a storage element. The processing element invokes a program stored in the storage element, to perform the method performed by the terminal in the foregoing method embodiments. The storage element may be located on a same chip with the processing element, that is, an on-chip storage element.

In another implementation, a program configured to perform the method performed by the terminal in the foregoing methods may be stored in a storage element that is on a different chip from the processing element, that is, an off-chip storage element. In this case, the processing element invokes or loads a program from the off-chip storage element to the on-chip storage element, to invoke and perform the method performed by the terminal in the foregoing method embodiments.

In still another implementation, the units that are of the apparatus applied to the terminal and that implements the steps in the foregoing methods may be configured as one or more processing elements. These processing elements are disposed in a modem subsystem. The processing element herein may be an integrated circuit, for example, one or more ASCs, one or more DSPs, or one or more FPGAs, or a combination of these types of integrated circuits. These integrated circuits may be integrated to form a chip.

The units of the terminal for implementing the steps in the foregoing methods may be integrated together and implemented in a form of a system-on-a-chip (SOC). The SOC chip is configured to implement the foregoing methods. At least one processing element and a storage element may be integrated in the chip, and the processing element invokes a program stored in the storage element to implement the foregoing methods performed by the terminal. Alternatively, at least one integrated circuit may be integrated in the chip, to implement the foregoing methods performed by the terminal. Alternatively, the foregoing implementations may be combined, where functions of some units are implemented by the processing element by invoking a program, and functions of some units are implemented in a form of an integrated circuit.

It can be learned that the foregoing apparatuses applied to the terminal may include at least one processing element and an interface circuit. The at least one processing element is configured to perform any method performed by the terminal provided in the foregoing method embodiments. The processing element may perform some or all steps performed by the terminal in a first manner: invoking the program stored in the storage element; or perform some or all of the steps performed by the terminal in a second manner: using an integrated logic circuit of hardware in the processing element and an instruction. Certainly, some or all of the steps performed by the terminal may alternatively be performed by using the first manner and the second manner.

As described above, the processing element herein may be a general-purpose processor, for example, a CPU, or may be configured as one or more integrated circuits for implementing the foregoing methods, for example, one or more ASICs, one or more microprocessors DSPs, or one or more FPGAs, or a combination of at least two of these integrated circuit forms.

The storage element may be a memory, or a general name of a plurality of storage elements.

Figure 14:
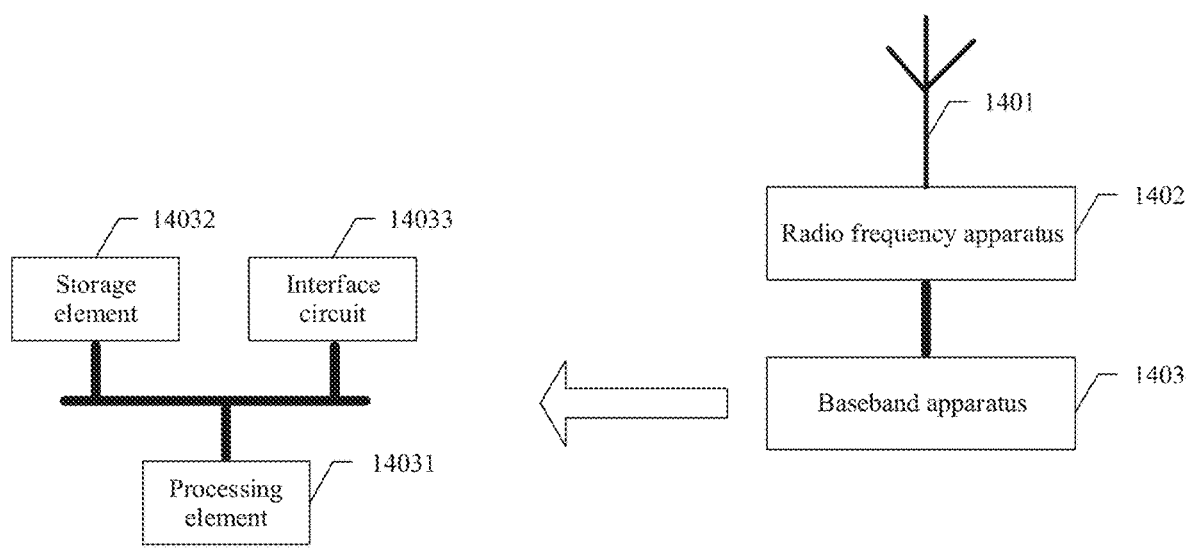
FIG. 14 is a schematic structural diagram of a network device according to an embodiment of this application.

FIG. 14 is a schematic structural diagram of a network device according to an embodiment of this application. The network device is configured to implement operations of the first network device or the second network device in the foregoing embodiments. As shown in FIG. 14, the network device includes an antenna 1401, a radio frequency apparatus 1402, and a baseband apparatus 1403. The antenna 1401 is connected to the radio frequency apparatus 1402. In an uplink direction, the radio frequency apparatus 1402 receives, via the antenna 1401, information sent by a terminal, and sends, to the baseband apparatus 1403, information sent by the terminal for processing. In a downlink direction, the baseband apparatus 1403 processes the information for the terminal, and sends the information for the terminal to the radio frequency apparatus 1402. The radio frequency apparatus 1402 processes the information for the terminal, and then sends the processed information for the terminal to the terminal via the antenna 1401.

The baseband apparatus 1403 may include one or more processing elements 14031, for example, include a main control CPU and another integrated circuit. In addition, the baseband apparatus 1403 may further include a storage element 14032 and an interface circuit 14033. The storage element 14032 is configured to store a program and data. The interface circuit 14033 is configured to exchange information with the radio frequency apparatus 1402. The interface circuit is, for example, a common public radio interface (CPRI). The foregoing apparatuses applied to the network device may be located in the baseband apparatus 1403. For example, the foregoing apparatus applied to the network device may be a chip in the baseband apparatus 1403, and the chip includes at least one processing element and an interface circuit. The processing element is configured to perform steps of any method performed by the foregoing network device, and the interface circuit is configured to communicate with another apparatus. In an implementation, the units of the network device that implement the steps in the foregoing methods may be implemented in a form of a program invoked by a processing element. For example, an apparatus applied to the network device includes a processing element and a storage element. The processing element invokes a program stored in the storage element, to perform the method performed by the network device in the foregoing method embodiments. The storage element may be located on a same chip with the processing element, that is, an on-chip storage element; or the storage element may be located on a different chip from the processing element, that is, an off-chip storage element.

In another implementation, the units that are of the apparatus applied to the network device and that implement the steps in the foregoing methods may be configured as one or more processing elements. These processing elements are disposed in a baseband apparatus. The processing element herein may be an integrated circuit, for example, one or more ASICs, one or more DSPs, or one or more FPGAs, or a combination of these integrated circuits. These integrated circuits may be integrated to form a chip.

The units of the network device for implementing the steps in the foregoing methods may be integrated together and implemented in a form of a system-on-a-chip (SOC). For example, the baseband apparatus includes the SOC chip, which is configured to implement the foregoing methods. At least one processing element and a storage element may be implemented in the chip, and the processing element invokes a program stored in the storage element to implement the foregoing methods performed by the network device. Alternatively, at least one integrated circuit may be integrated in the chip, to implement the foregoing methods performed by the network device. Alternatively, the foregoing implementations may be combined, where functions of some units are implemented by the processing element by invoking a program, and functions of some units are implemented in a form of an integrated circuit.

It can be learned that the foregoing apparatuses applied to the network device may include at least one processing element and an interface circuit. The at least one processing element is configured to perform any method performed by the network device provided in the foregoing method embodiments. The processing element may perform some or all steps performed by the network device in a first manner: invoking the program stored in the storage element; or perform some or all of the steps performed by the network device in a second manner: using an integrated logic circuit of hardware in the processing element and an instruction. Certainly, some or all of the steps performed by the network device may alternatively be performed by using the first manner and the second manner.

As described above, the processing element herein may be a general-purpose processor, for example, a CPU, or may be configured as one or more integrated circuits for implementing the foregoing methods, for example, one or more ASICs, one or more microprocessors DSPs, or one or more FPGAs, or a combination of at least two of these integrated circuit forms.

The storage element may be a memory, or a general name of a plurality of storage elements.

According to the method provided in the embodiments of this application, an embodiment of this application further provides a communications system, including the first network device, the second network device, the first terminal, and the second terminal described above.

An embodiment of this application further provides a data processing apparatus, which is applied to the first network device, the first terminal, or the second terminal, and includes at least one processing element (or chip) configured to perform the foregoing method embodiments.

This application provides a data processing program, where the program, when being executed by a processor, is configured to perform the methods in the foregoing embodiments.

This application further provides a program product, for example, a computer-readable storage medium, including the program of the foregoing data processing method.

In VoLTE-based voice communication, in addition to network quality, a coding mode used by a terminal also affects voice communication quality. In an existing VoLTE mechanism, most coding modes are non-redundancy coding modes. To be specific, a currently sent speech frame does not carry redundant information. Consequently, a packet loss concealment capability of a voice packet is relatively low, and voice communication quality declines, affecting user experience. An entire-frame redundancy coding mode is introduced only into a 13.2-kbps channel aware mode (CAM) of an enhanced voice service (EVS). To be specific, a currently sent speech frame carries a previously sent speech frame. In this way, if a receive end does not receive a speech frame that has been sent by a transmit end before, the receive end may receive again, in a currently received speech frame, the speech frame that is not received, so that the anti-packet-loss performance of the voice packet is improved. However, the existing entire-frame redundancy coding mode causes an increase in data sent by the transmit end, and when air interface signal quality is lower than a specified threshold, a transmission delay and a delay jitter are increased, causing more packet loss at the receive end. In conclusion, the entire-frame redundancy coding mode in the existing VoLTE mechanism is not applicable to a scenario in which the air interface signal quality is relatively poor.

Based on this, an embodiment of this application further provides a message transmission method, to further improve voice call quality and improve user experience.

Figure 15:
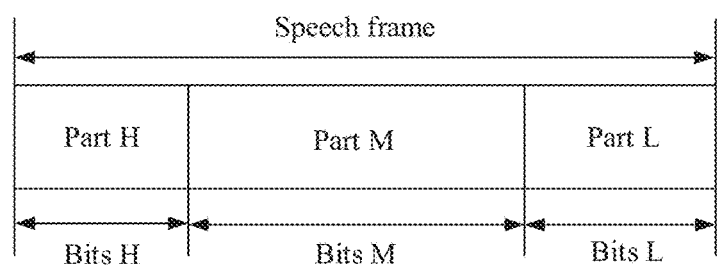
FIG. 15 is a schematic structural diagram of a speech frame according to this application.

Before the message transmission method provided in this application is described, a structure of the speech frame in the VoLTE mechanism is briefly described. FIG. 15 shows a structure of a speech frame in this application. A voice coding frame includes a part H, a part M, and a part L. The part H is used to transmit firstly important voice data, and information carried in the part H has a greatest impact on voice quality. If coded data of the part H is damaged, the voice quality is significantly declined. The part M is used to transmit secondly important voice data, the part L is used to transmit thirdly important voice data, and importance of coded data of the part L and the part M is lower than that of the coded data of the part H. Importance of the coded data of the part L is lower than that of the coded data of the part M. If an error occurs in transmission of the coded data of the part L and the coded data of the part M, call quality declines, but impact of the error in the coded data of the part L and the coded data of the part M on voice quality is less than impact of an error in the coded data of the part H on the voice quality. It should be noted that "firstly important", "secondly important", and "thirdly important" herein refer to an importance degree of voice data. "Firstly important" has a highest importance degree. "secondly importance" has an importance degree second to that of "firstly important", and "thirdly important" has an importance degree second to that of "secondly important".

The following describes a technical solution in an embodiment of this application with reference to the accompanying drawings.

Figure 16:
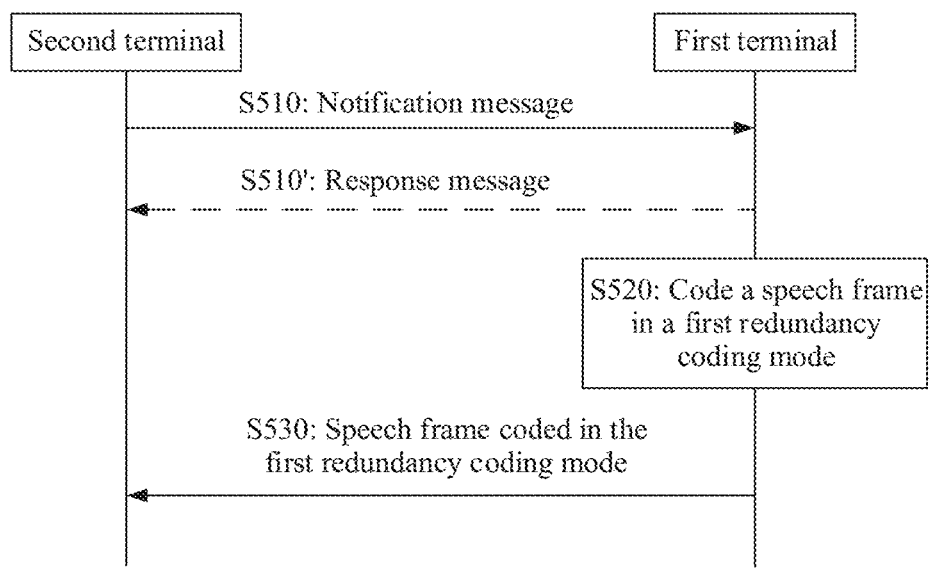
FIG. 16 is an implementation flowchart of a message transmission method according to an embodiment of this application.

FIG. 16 is an implementation flowchart of a message transmission method according to an embodiment of this application. As shown in FIG. 16, the method includes the following steps.

S510. A first terminal receives a notification message sent by a second terminal.

The notification message is used to notify the first terminal of coding a speech frame in a first redundancy coding mode. The first redundancy coding mode is that a speech frame i carries a first part of a speech frame i-x as redundancy, i is a positive integer greater than or equal to 1, x is a positive integer less than or equal to i, the first part includes an important part and/or a secondly important part. The important part refers to a part that the H bits located in the speech frame, and the secondly important part refers to a part that the M bits located in the speech frame.

Optionally, after receiving the notification message sent by the second terminal, the first terminal may further send a response message of the notification message to the second terminal. The response message is used to confirm that the first terminal codes the speech frame in the first redundancy coding mode. Refer to S510'.

After receiving the notification message sent by the second terminal, the first terminal performs the following steps:

S520. The first terminal codes the speech frame in the first redundancy coding mode.

S530: The first terminal sends, to the second terminal, the speech frame coded in the first redundancy coding mode.

The message transmission method provided in this application is applicable to different coding rates. This is not limited in this application.

It should be noted that the message transmission method provided in this application is applicable to scenarios of different network quality. In a possible application scenario, when determining that an air interface condition between the second terminal and a network device is poor, the second terminal uses the message transmission method provided in this application. For example, execution of S510 is triggered when at least one or more of the following conditions are met:

Condition 1: Radio signal quality of the second terminal and/or the first terminal is lower than a predefined or configured threshold.

Condition 2: A delay jitter of the second terminal and/or a delay jitter of the first terminal is greater than a predefined or configured threshold.

Condition 3: A packet loss rate of the second terminal and/or a packet loss rate of the first terminal is higher than a predefined or configured threshold.

The foregoing conditions may be separately used, or may be completely or partially used. In addition, the foregoing condition may be used in combination with another condition. When the foregoing condition is used in combination with the another condition, the condition is a necessary condition rather than a sufficient condition, and shall fall within the protection scope of this application.

In this scenario, the second terminal may determine the current air interface condition between the second terminal and the network device based on at least one of the packet loss rate, an end-to-end delay (a delay between the first terminal and the second terminal), and the delay jitter.

In the message transmission method provided in this application, the first terminal codes the speech frame in the first redundancy coding mode. Specifically, a currently sent speech frame carries an important part of a previously sent speech frame. Compared with a speech frame coded in the existing entire-frame redundancy coding mode, a speech frame coded in the first redundancy coding mode in this application includes less data, so that a packet loss concealment capability of a voice packet is enhanced while a data transmission burden in a network is reduced, thereby further improving voice call quality and improving user experience.

Figure 17:
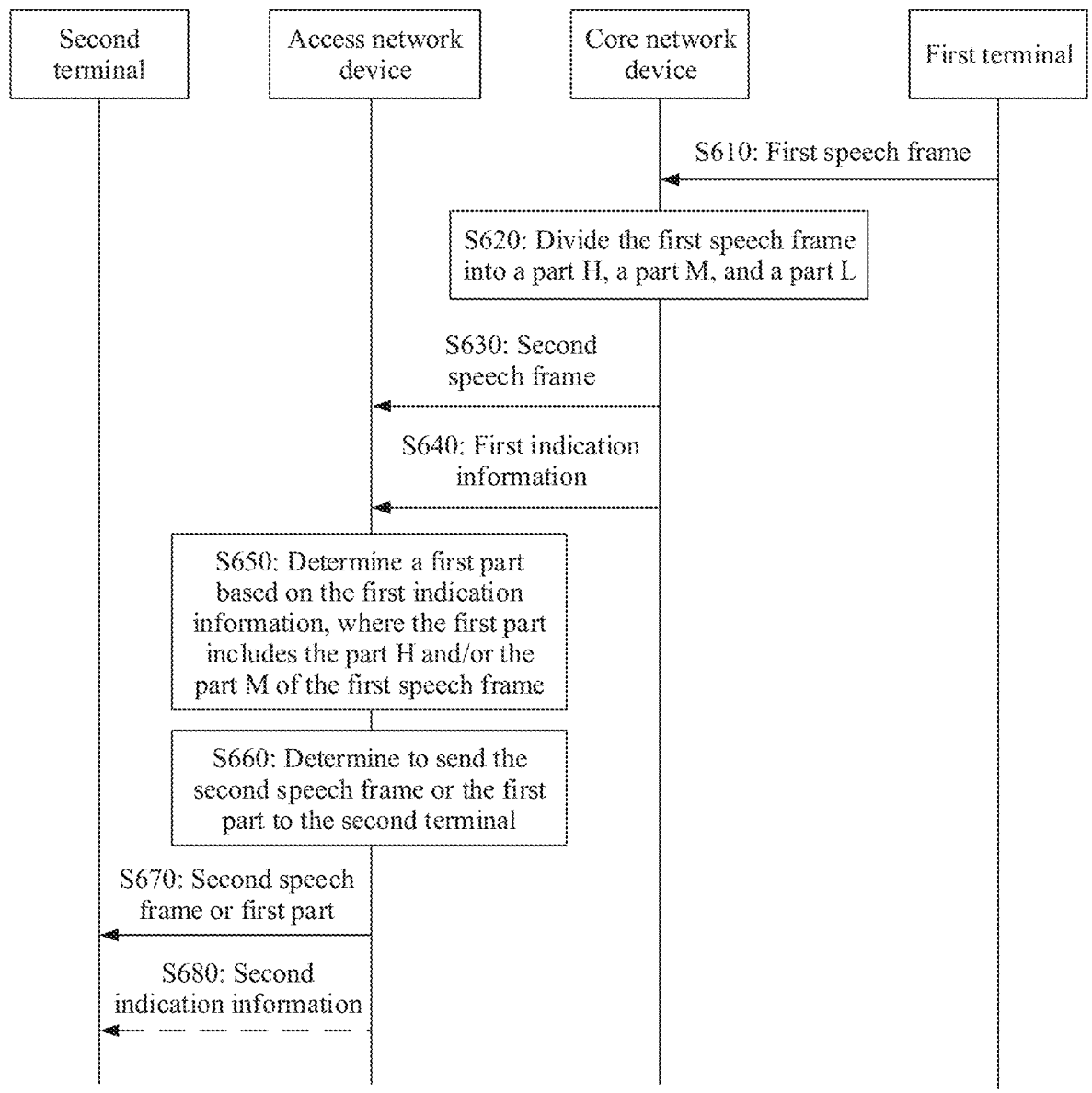
FIG. 17 is an implementation flowchart of another message transmission method according to an embodiment of this application.

FIG. 17 is an implementation flowchart of still another message transmission method according to an embodiment of this application. As shown in FIG. 17, the method includes the following steps.

S610: A core network device receives a first speech frame sent by a first terminal.

S620. The core network device divides the first speech frame into a part H, a part M, and a part L.

The part H refers to a part that the H bits located in a speech frame, the part M refers to a part of that the M bits located in the speech frame, and the part L refers to a part of the L bits located in the speech frame.

In this application, the first speech frame may be a speech frame not including a redundant part, or may be a speech frame including a redundant part. When the first speech frame is the speech frame including a redundant part, assume that the first speech frame includes a valid frame i and a redundant frame i-x, i is a positive integer greater than or equal to 1, and x is a positive integer less than or equal to i. In this case, that the core network device divides the first speech frame into the part H, the part M. and the part L may be understood as: the core network device divides the valid frame i and the redundant frame i-x into the part H, the part M, and the part L.

S630. The core network device sends, to an access network device, a second speech frame including a part H, a part M, and a part L.

S640: The core network device sends first indication information to the access network device, where the first indication information is used to indicate that the second speech frame includes the part H, the part M, and the part L.

In this application, that the first indication information is used to indicate that the second speech frame includes the part H, the part M, and the part L may include the following two understandings:

Understanding 1: The first indication information is used to indicate locations of the part H, the part M, and the part L in the first speech frame, or Understanding 2: The first indication information is used to indicate that the first speech frame is divided into the part H, the part M, and the part L, and locations of the part H, the part M and the part L in the first speech frame are predefined.

S650: The access network device determines a first part based on the first indication information, where the first part includes the part H and/or the part M of the second speech frame.

It should be noted that if the first speech frame is the speech frame including a redundant part, assume that the first speech frame includes a valid frame i and a redundant frame i-x. In this case, that the access network device determines the first part based on the first indication information includes: the access network device determines the part H and/or the part M included in the valid frame i and the redundant frame i-x respectively as the first part; or the access network device determines the valid frame i and the part H and/or the part M included in the redundant frame i-x as the first part.

Optionally, the first part is a PDCP PDU, and includes the part H and/or the part M of the second speech frame and a PDCP SN.

Optionally, the first part is a PDCP PDU, and includes the part H and/or the part M of the second speech frame, a PDCP SN, and a segment offset indication of position of the PDCP PDU within a PDCP SDU.

Optionally, the first part is an SDAP PDU, and includes the part H and/or the part M of the second speech frame, and an SDAP SN.

Optionally, the first part is an SDAP PDU, and includes the part H and/or the part M of the second speech frame, an SDAP SN, and a segment offset indication of position of the SDAP PDU within an SDAP SDU.

Figure 18:
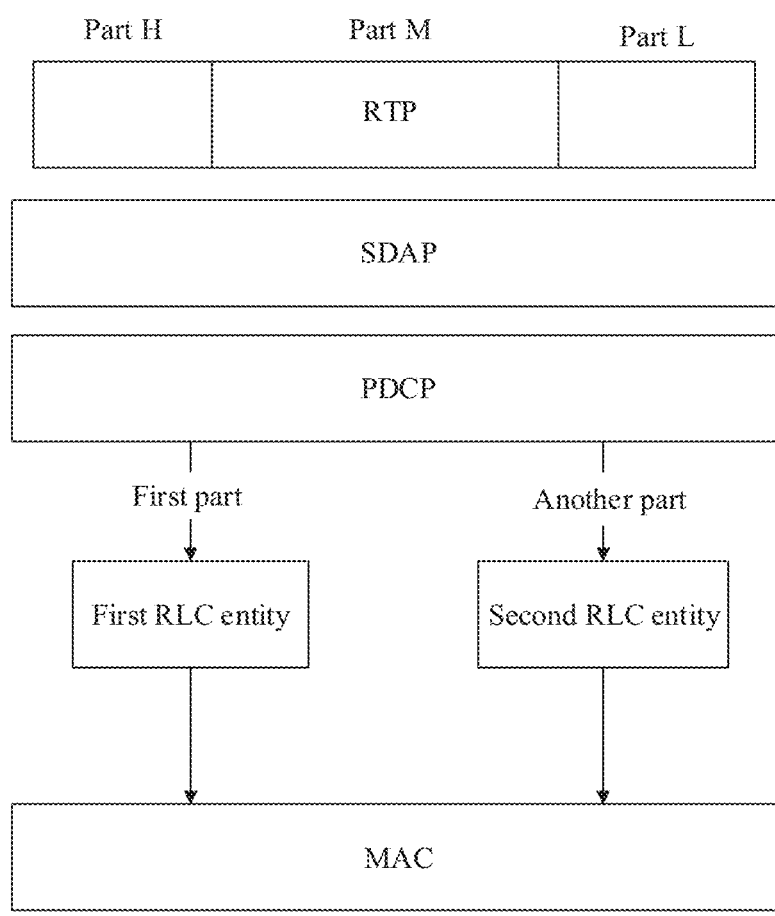
FIG. 18 is a schematic diagram of processing a speech frame by an access network device according to this application.

Optionally, the access network device determines the first part at a PDCP layer, and the part H and/or the part M included in the first part use a same PDCP PDU serial number (SN). In this implementation, the access network device may submit the first part to a first RLC entity, and submit other parts of the second speech frame than the first part to a second RLC entity. Refer to FIG. 18. Certainly, the access network device also submits the part H, the part M, and the part L that are included in the second speech frame to different RLC entities.

Optionally, the access network device determines the first part at the PDCP layer, and discards other parts than the first part. The first part forms a PDCP PDU and is submitted to the first RLC entity.

S660: The access network device determines to send the second speech frame or the first part to the second terminal.

In this application, the access network device may be an access device, for example, a RAN device, that connects the second terminal to a wireless network (for example, a CN).

Time for sending the first part and time for sending the second speech frame are not limited in this application. In an implementation, when radio signal quality of the second terminal is lower than a predefined or configured threshold, the access network device determines to send the first part to the second terminal. In still another implementation, when a delay jitter of the second terminal is greater than a predefined or configured threshold, the access network device determines to send the first part to the second terminal. In still another implementation, when a packet loss rate of the second terminal is higher than a predefined or configured threshold, the access network device determines to send the first part to the second terminal.

S670: The access network device sends the second speech frame or the first part to the second terminal.

Optionally, the access network device places the first part and the other parts in different code block groups (CBG) for sending.

S680: The access network device sends second indication information to the second terminal, where the second indication information is used to indicate that a redundant part of the second speech frame includes only the first part.

It should be noted that S680 is an optional operation, and the access network device may not send the second indication information to the second terminal either.

When receiving a part (for example, a part H), a PDCP entity of the second terminal starts a timer to wait for the other parts. After the timer expires, the PDCP entity of the second terminal reassembles the received parts and submits the reassembled parts to a higher layer.

Optionally, after the second terminal receives the second indication information of the access network device, the second terminal notifies the higher layer that the redundant part of the second speech frame includes only the first part, and the higher layer obtains the first part of the second speech frame for decoding.

The foregoing describes an example in which the second terminal receives the second speech frame or the first part. The following describes an example in which the second terminal sends the second speech frame or the first part to the access network device.

Time for sending the second speech frame or time for sending the first part by the second terminal to the access network device is not limited in this application. In an implementation, when the second terminal meets at least one or more of the following conditions, the second terminal sends the first part to the access network device:

Condition 1: The radio signal quality of the second terminal is lower than the predefined or configured threshold;

Condition 2: The delay jitter of the second terminal is greater than the predefined or configured threshold;

Condition 3: The packet loss rate of the second terminal is greater than the predefined or configured threshold; and Condition 4: The second terminal receives the second indication information sent by the access network device.

The foregoing conditions may be separately used, or may be completely or partially used. In addition, the foregoing condition may be used in combination with another condition. When the foregoing condition is used in combination with the another condition, the condition is a necessary condition rather than a sufficient condition, and shall fall within the protection scope of this application.

Optionally, the second terminal sends the first part and the other parts than the first part in different CBGs.

Optionally, the second terminal sends the first part and the other parts than the first part in different cells or bandwidth parts (BWP). For example, data of the first part, and data of the other parts than the first part are encapsulated into different PDCP PDUs, and submitted to two different RLC entities or different logical channels. A MAC entity does not multiplex the data of the two RLC entities or logical channels in one transport block. A physical layer places the two MAC PDUs in different CBGs.

Optionally, the second terminal may send indication information to the access network device, to indicate that the speech frame sent by the second terminal is a complete speech frame or a speech frame including the first part. An indication manner used by the second terminal for the access network device is similar to the foregoing indication manner used by the access network device for the second terminal, and details are not described herein.

Optionally, the second terminal may further receive third indication information sent by the access network device, where the third indication information is used to instruct the second terminal to start to send or stop sending the speech frame including only the first part.

In the message transmission method provided in this application, the speech frame coded in the first redundancy coding mode is transmitted. Specifically, a currently sent speech frame carries an important part of a previously sent speech frame. Compared with a speech frame coded in the existing entire-frame redundancy coding mode, a speech frame coded in the first redundancy coding mode in this application includes less data, so that a packet loss concealment capability of a voice packet is enhanced while a data transmission burden in a network is reduced, thereby further improving voice call quality and improving user experience.

The foregoing mainly describes the solutions provided in the embodiments of this application from a perspective of interaction between the first terminal and the access network device, between the first terminal and the second terminal, or between the access network device and the core network device. It may be understood that, to implement the foregoing functions, the first terminal, the second terminal, the access network device, and the core network device include corresponding hardware structures and/or software modules for performing the functions. With reference to the units and algorithm steps described in the embodiments disclosed in this application, the embodiments of this application can be implemented in a form of hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation falls beyond the scope of the technical solutions in the embodiments of this application.

Figure 19:
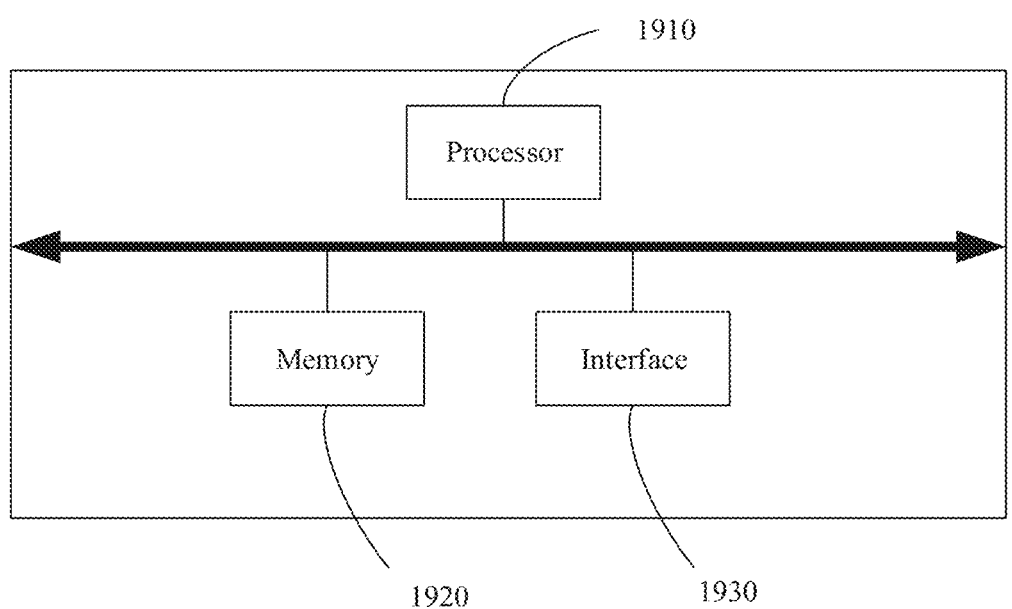
FIG. 19 is a schematic structural diagram of a core network device according to an embodiment of this application.

Based on a same inventive concept, an embodiment of this application further provides an apparatus for implementing the message transmission method, for example, provides an apparatus including a function for implementing the steps performed by the first terminal or the second terminal in any one of the foregoing message transmission methods. For a schematic diagram of the apparatus, refer to FIG. 11 and FIG. 13. Details are not described herein again. For another example, another apparatus including a function for implementing the steps performed by the access network device in any one of the foregoing message transmission methods is further provided. For a schematic diagram of the apparatus, refer to FIG. 12 and FIG. 14. Details are not described herein again. For another example, another apparatus including a function for implementing the steps performed by the core network device in any one of the foregoing message transmission methods is further provided. For a schematic diagram of the apparatus, refer to FIG. 19. As shown in FIG. 19, the apparatus includes a processor 1910, a memory 1920, and an interface 1930. The processor 1910, the memory 1920, and the interface 1930 are signal-connected. The apparatus includes the memory and the processor, the memory is configured to store a program, and the program is invoked by the processor to perform the method in the foregoing method embodiments. The processor herein may be an integrated circuit having a signal processing capability, for example, a CPU. Alternatively, functions of the foregoing units may be implemented by configuring the functions into one or more integrated circuits for implementing the foregoing methods, for example, one or more ASICs, one or more microprocessors DSPs, or one or more FPGAs, or a combination of at least two of these integrated circuit forms. Alternatively, the foregoing implementations may be combined.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some possible embodiments of this application have been described, a person skilled in the art can make changes and modifications to these embodiments once they learn the basic inventive concept. Therefore, the following claims aim to be construed as to cover the embodiments of this application and all changes and modifications falling within the scope of this application.

It is clear that, a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A data processing method, comprising:
obtaining, by a first terminal, packet delay budget adjustment information, wherein the packet delay budget adjustment information comprises a packet delay budget adjustment amount, wherein the obtaining, by the first terminal, packet delay budget adjustment information comprises:
receiving, by the first terminal, the packet delay budget adjustment information from a second terminal via real-time transport control protocol (RTCP) message, and wherein the packet delay budget adjustment information is determined by the second terminal, and the packet delay budget adjustment information indicates to the first terminal to increase or decrease a size of a jitter buffer at the first terminal;
adjusting, by the first terminal, the size of the jitter buffer based on the received packet delay budget adjustment information determined by the second terminal, wherein the adjusting comprises:
increasing, by the first terminal, the size of the jitter buffer based on the packet delay budget adjustment amount, wherein the packet delay budget adjustment amount is a positive value; and
buffering, by the first terminal, data based on the adjusted jitter buffer.

2. The method according to claim 1, wherein the first terminal receives the packet delay budget adjustment information from the second terminal via an application layer message.

3. The method according to claim 2, wherein the application layer message comprises a real-time transport control protocol (RTCP) codec mode request (CMR) message, or a real-time transport protocol (RTP) CMR message.

4. The method according to claim 1, wherein the adjusting further comprises:
decreasing, by the first terminal, the size of the jitter buffer based on the packet delay budget adjustment amount in case the packet delay budget adjustment amount is a negative value.

5. The method according to claim 1, wherein the adjusting further comprises:
determining, by the first terminal, whether the packet delay budget adjustment amount exceeds a predefined threshold.

6. The method according to claim 1, wherein the obtaining, by the first terminal, packet delay budget adjustment information comprises:
receiving, by the first terminal, a configuration parameter from the second terminal, wherein the configuration parameter is related to an air interface transmission delay, and the configuration parameter comprises preset duration of a packet data convergence protocol (PDCP) discard timer;
and;
determining, by the first terminal, the packet delay budget adjustment information according to the configuration parameter.

7. An apparatus, applied to a first terminal and comprising at least one processor, configured to invoke a program stored in a memory, wherein the program, when executed by the at least one processor, causes the apparatus to:
obtain packet delay budget adjustment information, wherein the packet delay budget adjustment information comprises a packet delay budget adjustment amount, wherein obtaining the packet delay budget adjustment information comprises:
receiving the packet delay budget adjustment information from a second terminal via real-time transport control protocol (RTCP) message, and wherein the packet delay budget adjustment information is determined the second terminal, and the packet delay budget adjustment information indicates to the first terminal to increase or decrease a size of a jitter buffer at the first terminal;
adjust the size of the jitter buffer based on the received packet delay budget adjustment information determined by the second terminal, wherein the adjusting comprises:
increase the size of the jitter buffer based on the packet delay budget adjustment amount, wherein the packet delay budget adjustment amount is a positive value; and
buffer data based on the adjusted jitter buffer.

8. The apparatus according to claim 7, wherein the packet delay budget adjustment information is carried in an application layer message.

9. The apparatus according to claim 8, wherein the application layer message comprises a real-time transport control protocol (RTCP) codec mode request (CMR) message, or a real-time transport protocol (RTP) CMR message.

10. The apparatus according to claim 7, wherein the adjusting further comprises:
decreasing the size of the jitter buffer based on the packet delay budget adjustment amount in case the packet delay budget adjustment amount is a negative value.

11. The apparatus according to claim 7, wherein the adjusting further comprises:
determining whether the packet delay budget adjustment amount exceeds a predefined threshold.

12. The apparatus according to claim 7, wherein the obtain packet delay budget adjustment information comprises:
receiving a configuration parameter from the second terminal, wherein the configuration parameter is related to an air interface transmission delay, and the configuration parameter comprises preset duration of a packet data convergence protocol (PDCP) discard timer; and;

determining the packet delay budget adjustment information according to the configuration parameter.

13. A non-transitory computer-readable storage medium, comprising a program, wherein when the program is executed by at least one processor, the at least one processor is caused to:
obtain packet delay budget adjustment information, wherein the packet delay budget adjustment information comprises a packet delay budget adjustment amount, wherein the obtaining, by a first terminal, packet delay budget adjustment information comprises:
receiving the packet delay budget adjustment information from a second terminal via real-time transport control protocol (RTCP) message, and wherein the packet delay budget adjustment information is determined by the second terminal, and the packet delay budget adjustment information indicates to the first terminal to increase or decrease a size of a jitter buffer at the first terminal;
adjust the size of the jitter buffer based on the received packet delay budget adjustment information determined by the second terminal, wherein the adjusting comprises:
increase the size of the jitter buffer based on the packet delay budget adjustment amount, wherein the packet delay budget adjustment amount is a positive value; and
buffer data based on the adjusted jitter buffer.

14. The non-transitory computer-readable storage medium according to claim 13, wherein the packet delay budget adjustment information is obtained from the second terminal via an application layer message.

15. The non-transitory computer-readable storage medium according to claim 14, wherein the application layer message comprises a real-time transport control protocol (RTCP) codec mode request (CMR) message, or a real-time transport protocol (RTP) CMR message.

16. The non-transitory computer-readable storage medium according to claim 13, wherein the adjusting further comprises:
decreasing the size of the jitter buffer based on the packet delay budget adjustment amount in case the packet delay budget adjustment amount is a negative value.

17. The non-transitory computer-readable storage medium according to claim 13, wherein the adjusting further comprises:
determining whether the packet delay budget adjustment amount exceeds a predefined threshold.

18. The non-transitory computer-readable storage medium according to claim 13, wherein the obtain packet delay budget adjustment information comprises:
receiving a configuration parameter from the second terminal, wherein the configuration parameter is related to an air interface transmission delay, and the configuration parameter comprises preset duration of a packet data convergence protocol (PDCP) discard timer; and;
determining the packet delay budget adjustment information according to the configuration parameter.

* * * * *

UNITED STATES PATENT AND TRADEMARK OFFICE
CERTIFICATE OF CORRECTION

PATENT NO. : 11,677,689 B2
APPLICATION NO. : 17/036990
DATED : June 13, 2023
INVENTOR(S) : Xiaoying Xu et al.

It is certified that error appears in the above-identified patent and that said Letters Patent is hereby corrected as shown below:

On the Title Page

Column 2, Item (56) Other Publications/Line 2 - Delete "2 018)." and insert -- 2018). --.

Signed and Sealed this
Fifth Day of September, 2023

Katherine Kelly Vidal
Director of the United States Patent and Trademark Office